US009634853B2

(12) United States Patent
Jones et al.

(10) Patent No.: US 9,634,853 B2
(45) Date of Patent: Apr. 25, 2017

(54) SMART POWER MANAGEMENT APPARATUS AND METHOD LEVERAGING MONITORING STATUS OF MANUAL SWITCH

(71) Applicants: Paul Jones, Calabasas, CA (US); Jack Phan, Mountain View, CA (US)

(72) Inventors: Paul Jones, Calabasas, CA (US); Jack Phan, Mountain View, CA (US)

( * ) Notice: Subject to any disclaimer, the term of this patent is extended or adjusted under 35 U.S.C. 154(b) by 277 days.

(21) Appl. No.: 14/174,826

(22) Filed: Feb. 6, 2014

(65) Prior Publication Data

US 2015/0220138 A1  Aug. 6, 2015

(51) Int. Cl.
| G06F 1/00 | (2006.01) |
| H04L 12/28 | (2006.01) |
| G06F 1/26 | (2006.01) |
| G06F 1/32 | (2006.01) |
| H02J 3/14 | (2006.01) |

(52) U.S. Cl.
CPC ............ *H04L 12/2803* (2013.01); *G06F 1/26* (2013.01); *G06F 1/3209* (2013.01); *G06F 1/3287* (2013.01); *H02J 2003/143* (2013.01); *Y02B 70/3266* (2013.01); *Y04S 20/242* (2013.01)

(58) Field of Classification Search
CPC ............ H02J 2003/143; Y02B 70/3266; Y04S 20/242; G06F 1/26; G06F 1/3287; G06F 1/3209; H04L 12/2803
See application file for complete search history.

(56) References Cited

U.S. PATENT DOCUMENTS

| 5,793,125 | A  | * | 8/1998 | Tarng | .................... G05B 19/042 |
|   |   |   |   |   | 307/117 |
| 7,023,357 | B2 | * | 4/2006 | Fu | ........................ H04L 12/5855 |
|   |   |   |   |   | 340/12.22 |
| 8,604,915 | B2 | * | 12/2013 | Clarke | ....................... H02J 3/14 |
|   |   |   |   |   | 200/51.02 |
| 9,026,826 | B2 | * | 5/2015 | Stafford | ............. H04N 21/4436 |
|   |   |   |   |   | 713/300 |
| 2012/0119577 | A1 | * | 5/2012 | Clarke | ....................... H02J 3/14 |
|   |   |   |   |   | 307/40 |
| 2014/0188294 | A1 | * | 7/2014 | Hassin | .................... G01D 4/002 |
|   |   |   |   |   | 700/286 |

* cited by examiner

*Primary Examiner* — Thomas Lee
*Assistant Examiner* — Zhipeng Wang
(74) *Attorney, Agent, or Firm* — Jundong Ma

(57) ABSTRACT

A smart power management unit (SPMU) apparatus and method of intelligently switching from a "disconnect mode" to a "connect mode" in regards to power-supplying to a paired downstream load device by programmatically monitoring whether there is change in state of the manual switch of the load device, is provided. The SPMU comprises relay module configured to operate in either operation mode (connect mode) or monitor mode (disconnect mode), and controller module configured to determine the operating mode of relay module. When in monitor mode, relay module is configured to disconnect the power supply from the load device while simultaneously enable a monitoring means configured to monitor a change in state of the manual switch. Upon monitoring a change in state of the manual switch based on a response signal supplied from the monitoring means, the controller module switches the relay module from monitor mode to operation mode.

19 Claims, 8 Drawing Sheets

SMART POWER MANAGEMENT APPARATUS AND METHOD LEVERAGING MONITORING STATUS OF MANUAL SWITCH

BACKGROUND

1. Technical Field

The present disclosure generally relates to a smart power management apparatus, and more particularly to a remote-controllable smart power management apparatus which leverages monitoring the status of a manual switch of an electronic device, of which the smart apparatus manages and controls the consumption of power.

2. Description of the Related Art

Various home automation technologies have been developed to allow members of a household to remotely control and manage the power consumption of electronic devices in the household. Typically, in a home automation system, a conventional power management unit is paired (connected) to one or more individual electronic devices (which a household would like to remotely control and manage its power consumption) in a manner that turns the power management unit into the main power source thereof, thus enabling the power management unit to directly control and manage all aspects of power consumption thereof. In a nutshell, such a power management unit is usually networked with and uniquely identified to a control center of the home automation system local in the home of the household, so that the power management unit can receive one or more control commands that are directed thereto from the control center. Upon receiving a control command, the power management unit may use its internal modules to perform specific power control and management functions, such as turning on or off the power supplied to a paired electronic device, or retrieving stored power consumption statistics of the paired electronic device and sending the retrieved statistics to the control center. The control center, which may be network-capable device or node such as a set-top box, is usually connected to the Internet either through a local area network (which has a gateway to the Internet) or through its own gateway to the Internet. If a household member would like to remotely turn off the power of a target in-home electronic device, such as a lamp or TV, the household member may use a custom smartphone app or a web browser for a PC to log into the control center, identify the power management unit connected to the target electronic device through the control center, and send a "powering-off" command to the power management unit through the control center, resulting in the target electronic device being remotely turned off.

When connected to an electronic device so as to control and manage the power consumption thereof, a conventional power management unit, however, may cause inconvenience to users (e.g., the aforementioned household members). More specifically, if one household member (e.g., the husband of the household) remotely turns off a target electronic device (e.g., a lamp) from work through a smartphone app for the sake of saving power, another household member (e.g., the wife of the household) who happens to come back home early and need to use the lamp but does not have convenient access to the smartphone app, may only find that she has no way to turn the lamp back on other than, e.g., calling her husband (who may happen to be in meetings all day) to remotely do so. This is because once the conventional power management unit turns off its internal switch or relay controlling the power supply to the lamp, the wife cannot, e.g., turn the knob switch of the lamp to turn on the lamp.

Some conventional power management units may be each equipped with a toggle switch, which, when pressed, can toggle the state of the internal switch or relay of the host power management unit, thus making it possible for the wife to turn on the lamp with turning the knob switch of the lamp (after the wife uses the toggle switch to turn on the internal switch or relay). However, for most users who are usually not savvy to power management apparatuses, they usually are not aware of the existence of such a toggle switch on a conventional power management unit, or do not know the toggling function of such a toggle switch even if they know the existence thereof. Indeed, for most users, learning to know the existence of such a toggle switch, let alone learning to know the function of such a toggle switch, can be an annoying and inconvenient experience, given that it would require them to go over instruction manuals or talk to someone who is savvy about power management apparatuses.

Furthermore, it is quite common that a power management unit is chosen to be installed or otherwise put in "obscure" or "hard-to-reach" places, since people do not usually view a power management unit as an aesthetically displayable item in a home or an office environment. For example, a power management unit, which may be produced in the form of rectangular cuboid like a power adapter, can be easily "hidden" somewhere behind a chest cabinet against the wall or underneath a bed or a bulky entertainment center. Under any of those or similar circumstances, even if the wife not only knows the existence of such a toggle switch but also knows full well of the intended function thereof, the wife would still be forced to awkwardly force her way—e.g. by slightly pushing chest cabinet away from the wall so as to make room for one of her arms or simply extending one of her arms beneath the bed or the bulky entertainment center—in order to reach that "hidden" power management unit so as to press its toggle switch. Thus, it is quite apparent that even if a conventional power management unit is equipped with such a toggle switch, it is still quite annoying or inconvenient for most users to be aware of the existence thereof and the function thereof, or take advantage thereof.

Therefore, there is a need to address the aforementioned dilemmas (including aforementioned possible dilemmas associated with a toggle switch) that are faced by users (such as the aforementioned wife of the household) resulting from the inability of a conventional power management unit or system—in a situation when a target electronic device paired with the conventional power management unit (such as the aforementioned lamp) has been remotely powered off through the conventional power management unit or system—to enable a human (having no convenient or ready access to, e.g., a custom smart phone app) to regain control of the powering-on or powering-off of the paired target electronic device (such as the aforementioned lamp) without imposing undue inconvenience or effort on the human.

BRIEF SUMMARY

In one aspect, the present disclosure provides a smart power management unit (SPMU) configured to monitor the state of a manual switch of a target electronic device paired with the SPMU when the target device has been cut off power by the SPMU (as resulting from, e.g., a remote operation performed on the SPMU), detect a change in state of the manual switch (as resulting from an intervention on the manual switch by a human), and reconnect power to the paired device based on the detected change in state of the manual switch, thereby enabling the human to regain control of the powering-on or the powering-off of the target electronic device through the manual switch thereof.

In another aspect, the disclosed smart power management unit (SPMU) comprises a relay module, controller module and a monitoring-facilitator module. The relay module is configured to function in a monitor mode and an operation mode. During the monitor mode, the relay module is configured to disconnect the incoming A/C power supply from the paired electronic device and simultaneously, through, inter alia, connecting both a monitoring signal generator and a monitoring-facilitator module to the paired electronic device, form a monitoring means (path), through which the controller module can detect a change in state of the manual switch. During the operation mode, the relay module is configured to connect the paired electronic device to the incoming A/C power supply. In one embodiment, the relay module is also configured to disconnect the paired electronic device from the monitoring-facilitator module when in operation mode.

In yet another aspect, the disclosed monitoring means comprises a monitoring signal source configured to supply (produce) a monitoring signal, and a monitoring-facilitator module configured to simplify, normalize or otherwise transform one or more monitoring response signals (generated by the paired electronic device based on the monitoring signal) to one or more corresponding monitoring results signals indicative of one or more changes in state of the manual switch of the paired electronic device, so as to facilitate the real-time monitoring or otherwise detecting of a change in state of the manual switch of the paired electronic device. In particular, when the SPMU (and thus the relay module) is in monitor mode, the disclosed monitoring means is formed when the monitoring-facilitator module becomes connected in series with the manual switch of the paired electronic device, the load of the paired electronic device, and the monitoring signal source. The monitoring signal and the monitoring-facilitator module are so configured that when the manual switch of the paired electronic device is either opened or closed (presumably by manual action of a human)—which results in the monitoring-facilitator module being either not energized or energized with the monitoring signal, respectively—the monitoring-facilitator module generates an output signal accurately indicating either the opening or the closure of the manual switch during each time interval of a continuous series of time intervals, respectively, regardless of the impedance value of the load of the paired electronic device. Analysis on the output signal, as performed by the controller module, thus informs the controller module as to whether there is a change in state of the manual switch (presumably effectuated by manual action of a human) across two consecutive time periods. If the controller module detects a change in state of the manual switch through the aforementioned analysis, the controller module instructs the relay module to switch to the operation mode, resulting in the relay module switching to the operation mode by reconnecting the pair electronic device to the incoming A/C power supply. This in turn gives back to the human the control (otherwise lost by virtue of the relay module disconnecting the incoming A/C power supply from the paired electronic device) to power on or power off the paired electronic device through the manual switch. In one embodiment, the monitoring signal source is an integral part of the controller module.

In yet another aspect, the disclosed monitoring signal is a PWM signal of a pre-set frequency which enables the disclosed monitoring-facilitator module to generate an output signal accurately indicating either the opening or the closure of the manual switch during each cycle (period) thereof, respectively, regardless of the impedance value of the load of the paired electronic device. The disclosed monitoring-facilitator module comprises a comparator with its input terminal connected to an output terminal of the disclosed relay module and its reference terminal connected to ground. The output terminal of the relay module is in serial connection to the manual switch and the load of the paired electronic device when the relay module (and thus the disclosed SPMU) is in the monitor mode, and is disconnected from the manual switch and the load of the paired electronic device when the disclosed SPMU is in the operation mode.

In yet another aspect, the disclosed smart power management unit (SPMU) comprises hardware and software components interfacing an existing local home automation network and/or a local area network so that the disclosed SPMU, in one hand, can be readily adapted to the existing local home automation network or the local area network, and in another hand, can leverage its disclosed monitoring ability to enable a human to regain control of the powering-on or the powering-off of a paired electronic device through the manual switch of the paired device when the SPMU has been remotely instructed to disconnect the incoming A/C power supply to the paired electronic device.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3A is a block diagram illustrating exemplary components of the controller module, and FIG. 3B is a block diagram illustrating exemplary software modules of the controller module.

DETAILED DESCRIPTION

Figure 1:
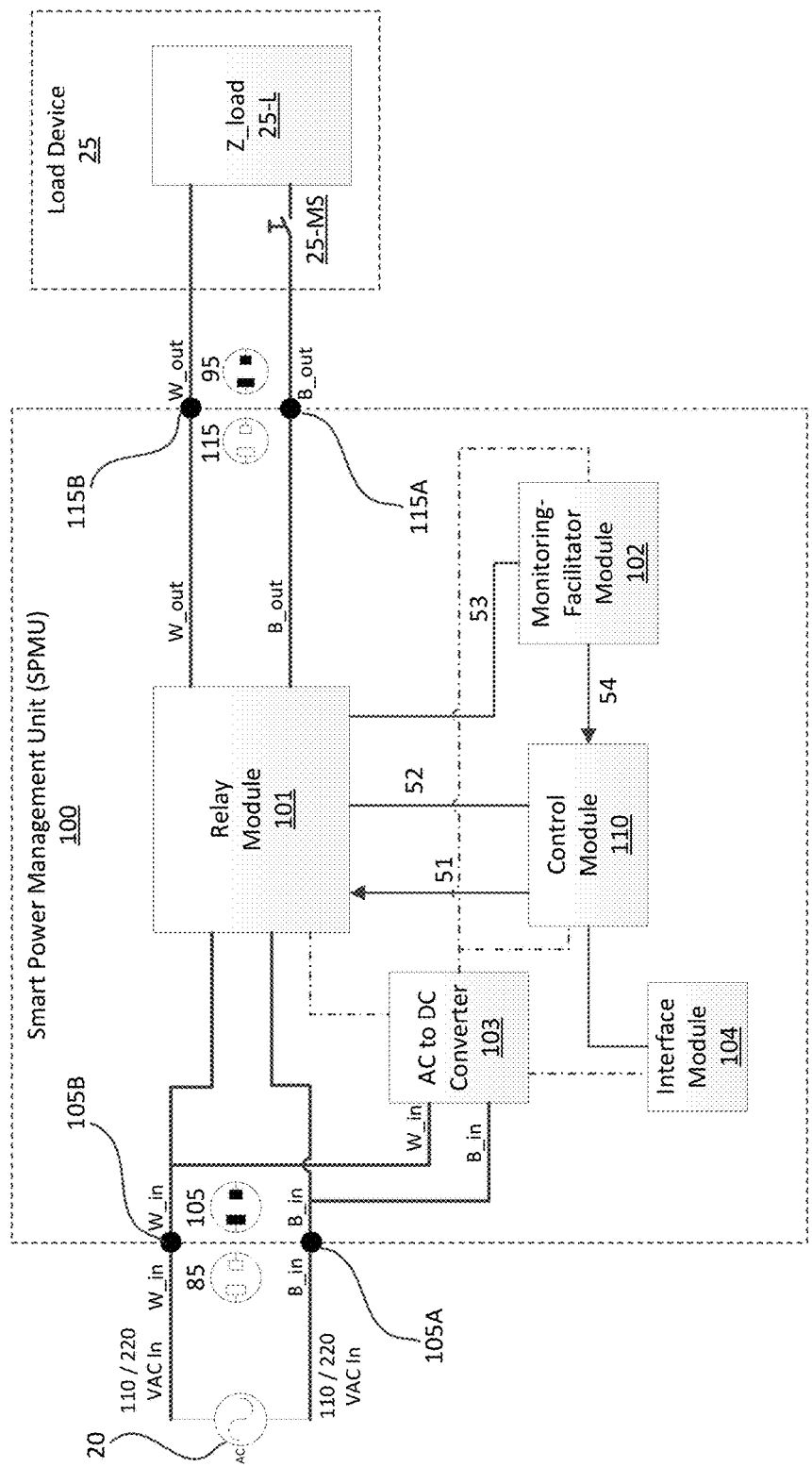
FIG. 1 is block diagram illustrating the general functional modules of the disclosed smart power management apparatus and method, according to one or more embodiments of the present disclosure.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Moreover, the use of the terms first, second, etc. do not denote any order or importance, but rather the terms first, second, etc. are used to distinguish one element from another.

Those of ordinary skill in the art will appreciate that the circuit components and basic configuration depicted in the following figures may vary. Other circuit components may be used in addition to or in place of the components depicted. The depicted example is not meant to imply architectural or other limitations with respect to the presently described one or more embodiments and/or the general disclosure.

Within the descriptions of the different views of the figures, the use of the same reference numerals and/or symbols in different drawings indicates identical, similar, or closely related items, and similar or closely related elements can be provided similar names, reference numerals, and reference alpha-numerals throughout the figures. If a reference numeral is once used to refer to a plurality of like elements, unless required otherwise by context, the reference numeral may refer to any, a subset of, or all of, the like elements in the figures bearing that reference numeral. A reference alpha-numeral (such as "105A") may refer to one implementation or one portion of one element or a plurality of like elements bearing the same base reference numeral (such as "105"). The specific identifiers/names, reference numerals and reference alpha-numerals assigned to the elements are provided solely to aid in the description and are not meant to imply any limitations (structural or functional or otherwise) on the described embodiments.

In the description, relative terms such as "left," "right," "vertical," "horizontal," "upper," "lower," "top" and "bottom" as well as any derivatives thereof should be construed to refer to the logical orientation as then described or as shown in the drawing figure under discussion. These relative terms are for convenience of description and are not intended to convey any limitation with regard to a particular orientation.

As used herein, the term "manual switch" of an electronic device shall be broadly construed to encompass any switch equipped on, associated with, or otherwise linked to an electronic device such that a human intervention on the switch is needed to change the contemporaneous state of the switch from an "open" state or a "closed" state, or vice versa, so as to either power on or power off the electronic device in accordance with the contemporaneous state. Thus, the term "manual switch" encompasses not just a conventional manual switch, such as a knob switch or a press switch, whose change of state is triggered by a human's turning or pressing on the physical switch, but also a non-conventional switch whose change of state is triggered by, e.g., the presence of a human biometric characteristic (e.g., a fingerprint or an eye retina of a specific human) or the presence of motion of a human. The term "manual switch" may even encompass a short-range "remotely triggered switch" whose change of state is triggered by a human's action on a corresponding remote control.

As used herein, the terms "signal level", "input level" and other similar terms, unless otherwise specified with respect to a particular measurement characteristic, refer to any of voltage level, current level, power level and any combination thereof, as applicable.

With reference now to the figures, and beginning with FIG. 1, there is illustrated a block diagram illustrating the general functional modules of the disclosed smart power management apparatus and method, according to one or more embodiments of the present disclosure. Referring to FIG. 1, the disclosed smart power management apparatus 100, which may also be referred to as smart power management unit (SPMU) 100, may comprise relay module 101, control module 110, monitoring-facilitator module 102, AC to DC converter module 103 and interface module 104.

As shown, SPMU 100 may receive input power (such as standard 110/220V AC power) from a standard AC power source 20, through a "hot" line (wire) and a "neutral" line (wire) originating from the AC source 20. Since a "hot" line (wire) and a "neutral" line (wire) are usually colored in black and white, respectively, throughout the figures where there are "hot" and "neutral" input and output lines of SPMU 100, an input "hot" line (wire) and an input "neutral" line (wire) are labeled "B_in" and "W_in", respectively, and an output "hot" line (wire) and an ouput "neutral" line (wire) are labeled "B_out" and "W_out", respectively.

In one implementation, SPMU 100 may include an AC power input terminal 105 configured to receive AC power. The AC power input terminal 105 may comprise a "hot" line input connector 105A and a "neutral" line input connector 105B, which are configured to receive and extend an input "hot" line B_in and an input "neutral" line W_in, respectively. As exemplified, the A/C power input terminal 105 may be implemented in a form of an AC power plug 105, which, as well known, is an electrical plug having male connectors 105A and 105B corresponding to or serving as input connectors 105A and 105B. In receiving AC power from AC source 20, the AC power plug 105 may be plugged into an AC power socket (outlet) 85 (which may be implemented in a form of an electrical outlet 85) by having its male connectors 105A and 105B plugged into corresponding female connectors of the AC power socket 85.

In one implementation, SPMU 100 may include an AC power output terminal 115 configured to output AC power. An implementation of the AC power output terminal 115 may be "symmetrical" to a corresponding implementation of the AC input terminal 105. For example, the AC power output terminal 115 may comprise a "hot" line output connector 115A and a "neutral" line output connector 115B, which are configured to output and extend an output "hot" line B_out and an output "neutral" line W_out, respectively. As exemplified, the A/C power output terminal 115 may be implemented in a form of an AC power socket (outlet) 115, which, as well known, is an electrical outlet having female connectors 115A and 115B corresponding to or serving as input connectors 115A and 115B. In outputting AC power to Z_load 25-L, which is the load of a paired electronic load device 25, the AC power socket 115 may electrically receive an AC power plug 95 of (extended from) the paired load device 25 by having corresponding male connectors of AC power plug 95 plugged into female connectors 115A and 115B of the AC power socket 115.

In one implementation, SPMU 100 may be tightly integrated or incorporated into the load device 25. Thus, as a skilled artisan appreciates, among other things, one or both of input terminal 105 and output terminal 115 may not be needed.

It is well-known that a manual switch of an electronic load device is usually connected in series with the load of the same load device when the manual switch is provided to connect or disconnect AC (or DC) power to or from the load. Thus, as shown, manual switch 25-MS of the paired load device 25 is in series connection with Z_load 25-L of the same paired load device 25.

Relay module 101, in one aspect, is configured to receive AC power (via, e.g., AC power input terminal 105), receive one or more power control signals 51 from controller module 110, and selectively output (conduct) received AC power (via, e.g., AC power out terminal 115) to Z_load 25-L based on the received one or more power control signals 51. More specifically, if a power control signal 51 received from controller module 110 indicates that relay module 101 should supply (relay or conduct) received power supply (AC power) to Z_load 25-L, relay module 101 is configured, in accordance with a first mode, to connect the received AC power to Z_load 25-L, thereby supplying (relaying) received AC power to Z_load 25-L. In this first mode, relay module 101 is so configured that the conduction of AC power to Z_load 25-L is entirely dependent on the state of manual switch 25-MS, thus effectively yielding the powering control (namely, powering-on or powering-off) of Z_load 25-L entirely to a human operating manual switch 25-MS. For the purpose of the present disclosure, this first mode is referred to as "the operation mode."

If a power control signal 51 received from controller module 110 indicates that the relay module 101 should shut off power supply (AC power) to Z_load 25-L, relay module 101 is configured, in accordance with a second mode, to disconnect the received AC power from Z_load 25-L, thereby disconnecting AC Power from Z_load 25-L. In the second mode, relay module 101 is so configured that there is simply no conduction of AC power to Z_load 25-L even if the manual switch 25-MS is in the "closed" state, thereby effectively hijacking the powering control (namely, powering-on or powering-off) of Z_load 25-L through manual switch 25-MS away from any human who may be in a position to operate manual switch 25-MS.

As briefly discussed in the "Description of the Related Art" section, when an internal relay of a conventional power management unit is in this second mode or a mode similar—where the conduction to the paired electronic device (such as a lamp) is shutoff by the internal relay of the conventional power management unit—a human, even if in a position to operate or otherwise intervene on the manual switch of the paired electronic device, often has practically no way to effectively control the powering-on or powering-off of the paired electronic device without going through undue inconvenience or effort. By contrast, with the disclosed SPMU 100, when relay module 101 is in the second mode, the entire SPMU 100 is so configured that the controller module is able to programmatically monitor the state of manual switch 25-MS so as to detect a change in state of manual switch 25-MS and subsequently mange to yield the powering control of Z_load 25-L back to a human operating or intervening on manual switch 25-MS. Hence, for the purpose of the present disclosure, this second mode is referred to as "the monitor mode."

Relay module 101, in another aspect, is configured to electrically connect monitoring-facilitator module 102 to Z_load 25-L (and therefore also to manual switch 25-MS, which is a manual switch of Z_load 25-L) when relay module 101 is configured in accordance with the monitor mode, and is configured to electrically disconnect monitoring-facilitator module 102 from Z_load 25-L (and therefore also from manual switch 25-MS) when relay module 101 is configured in accordance with the operation mode.

In the context of the present disclosure, both the operation mode and the monitor mode, which are mentioned above as applicable to relay module 101, are also applicable to the entire SPMU 100 as an operating mode of SPMU 100. In other words, SPMU 100 may be referred to as operating in the operation mode or the monitor mode when relay module 101 is configured in accordance with the operation mode or the monitor mode, respectively.

Controller module 110 is where the "brain" and "intelligence" of SPMU 100 is, or in other words, is what makes SPMU 100 "smart". In one aspect, controller module 110 is configured to supply one or more power control signals 51 to relay module 101 so as to selectively control and manage power consumption by Z_load 25-L (via relay module 101).

In another aspect, when SPMU 100 operates in the monitor mode, controller module 110 is configured to supply a monitoring signal 52 adaptively structured to work in concert with monitoring-facilitator module 102 so as to enable controller module 110 to receive one or more signals 54 indicative of the contemporaneous state of manual switch 25-MS from monitoring-facilitator module 102. In yet another aspect, controller module 110 is configured to receive one or more signals 54 from monitoring-facilitator module 102 and supply a power control signal 51 signaling relay module 101 to operate in the operation mode (namely, to conduct AC power to Z_load 25-L) when the received one or more signals 54 is/are indicative of a change in state of manual switch 25-MS. In yet another aspect, controller module 110 is configured to interface with one or more existing home automation networks (systems), so that SPMU 100 can be "plugged" into or otherwise "tapped" into the one or more existing home automation networks to become a part thereof. This enables SPMU 100 to leverage whatever existing functionalities provided by the one or more existing home automation networks.

Monitoring-facilitator module 102 is configured to work in concert with an adaptively structured monitoring signal 52 (such as monitoring signal 52 supplied by controller module 110) to facilitate the real-time monitoring or otherwise detecting of a change in state of manual switch 25-MS, when monitoring-facilitator module 102 is electrically connected to load device 25 as part of a monitoring path. In particular, monitoring-facilitator module 102 may be configured to receive (via, e.g., relay module 101) a monitoring response signal 53 generated by the load device 25 based on the adaptively structured monitoring signal 52, and simplify, normalize or otherwise transform the monitoring response signal 53 to a monitoring facilitator signal 54 indicative of a change in state of manual switch 25-MS as such a change-in-state occurs. Output signal 54 may then be used to detect whether there is a change in state of manual switch 25-MS. For example, a change in waveform pattern of output signal 54 over two appropriately selected consecutive time periods may indicate a change in state of manual switch 25-MS across the two consecutive time periods. As shown, output signal 54 is fed into controller module 110 so that the latter may use output signal 54 to decide and set the contemporaneous operating mode of SPMU 100 (through, e.g., one or more control signals 51).

AC to DC converter module 103 is configured to convert incoming AC power (received via, e.g., AC power input terminal 105) to DC power, so as to provide DC power to other component modules of SPMU 100 which may need DC power. In other words, AC to DC converter module 103 functions as a DC power supply for component modules of SPMU 100 in need of DC power. Thus, as illustrated, AC to DC converter module 103 may supply converted DC power to, e.g., relay module 101, monitoring-facilitator module 102, controller module 110, and interface module 104 through its respective connections to those component modules of SPMU 100. As a skilled artisan appreciates, as a DC power supply, AC to DC converter module 103 may be replaced, or rendered optional, by other one or more alternative modules configured to supply DC power, such as a battery module configured to use battery to supply DC power.

Interface module 104 is configured to provide a user interface through which a human user may, e.g., configure or interact with SPMU 100, or be apprised of status information about SPMU 100. In one implementation, interface module 104 may include a toggle switch enabling a human user to, e.g., toggle the operating mode of SPMU 100 between the operation mode and the monitor mode. In one implementation, interface module 104 may include a touch screen enabling a user to use the touch screen and the graphical user interface provided thereon to view and configure various settings supported by SPMU 100 or information about SPMU 100. Examples of these various settings may include settings related to scheduling of powering on and powering off (of paired one or more electronic devices) and settings related to identification of SPMU 100. In one implementation, interface module 104 may include a set of LEDs whose patterns of "on" and "off" indicates various status information about SPMU 100. In one implementation, interface module 104 may include a sequence of buttons through which a user may set various configurations for SPMU 100.

Figure 2:
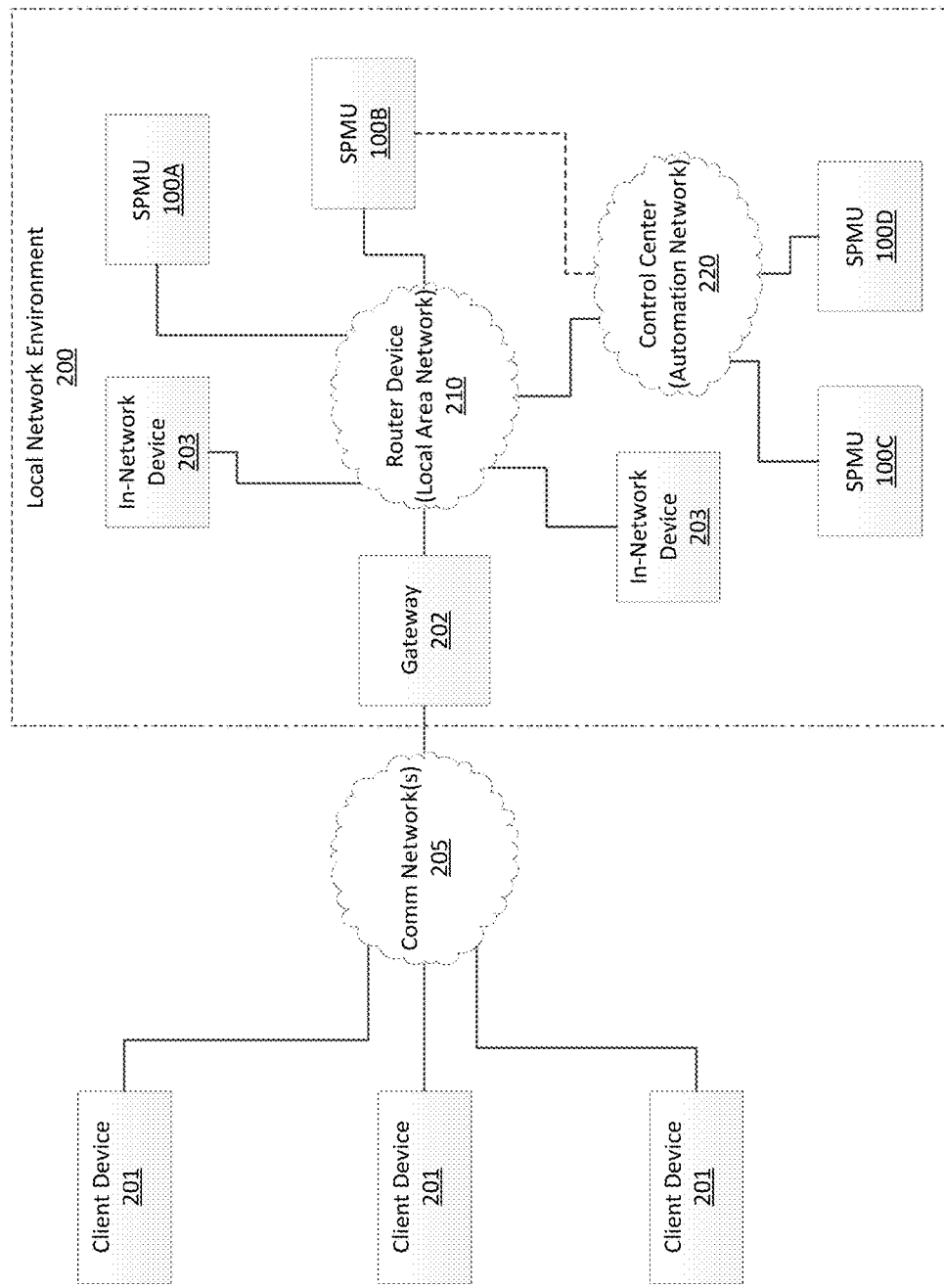
FIG. 2 is a general block diagram illustrating an exemplary operating network environment for the disclosed smart power management apparatus and method, according to one or more embodiments of the present disclosure.

FIG. 2 is a general block diagram illustrating an exemplary operating network environment for the disclosed smart power management apparatus and method, according to one or more embodiments of the present disclosure. The exemplary operating environment may comprise one or more local network environments 200 (where a plurality of SPMUs 100 are deployed) and a plurality of networking-capable client devices 201, with client devices 201 and local networks being communicatively coupled to each other through one or more communication networks 205, which may include Internet and/or one or more interconnected networks, such as one or more cellular networks, or one or more backbone networks.

Each local network environment 200—which may be established at, e.g., a home, an office, or a store—may comprise a gateway device 202 and a plurality of in-network devices 203 of one or more private local area networks deployed behind gateway device 202. A gateway device 202 functions as a gateway to a communication network 205, such as an Internet. For the ease of discussion, Internet and the illustrated one or more communication networks 205 may be referred interchangeably, with the understanding that communication network(s) 205 may encompass Internet and/or other networks, and Internet is used as an example of communication network(s) 205. In one embodiment, gateway device 202 may provide or otherwise enable access to Internet through one or more interfacing devices (such as a DSL, cable, fiber-optic, or cellular modem) which interface with or otherwise enable communication (via communication channels) over infrastructure of an incoming communication network (such as a DSL. HFC, RFoG, FIOs, or cellular network).

Gateway device 202 may provide various known networking related functions or services (via, e.g. one or more software "server" programs, or one or more special hardware devices incorporated therein) so as to facilitate its being an intermediary between the Internet and a plurality of in-network devices 203 of one or more private local area networks with often times a single public IP address assigned to the Internet connection which gateway device 202 establishes through its one or more interfacing devices. Examples of such known networking related services may include DHCP ("Dynamic Host Configuration Protocol") service, NAT ("Network Address Translation") service, and a firewall service.

Gateway device 202 may incorporate or otherwise be bundled with a wired or wireless router 210 which builds or otherwise establishes one or more local area networks (LAN) 210 using, e.g., known Ethernet (for wired communication) and/or WiFi (for wireless communication) technologies and/or standards such that wired or wireless networking-capable in-network devices 203 may be joined to LAN 210 so as to, inter alia, communicate with each other through LAN 210. Alternately, router 210 may be a stand-alone device, and provided separately from gateway device 202.

Examples of a networking-capable in-network device 203 may include a smart phone, a tablet, a PC, a laptop, a sensor, a conventional power management unit, and an SPMU 100, so long as, e.g., the in-network device supports one or more network interfaces (such as Ethernet or WiFi) which the LAN 210 is built upon or otherwise supports. Thus, as illustrated, the plurality of in-network devices 203 may include a plurality of SPMUs 100.

One or more automation networks 220 (for, e.g., home or office) for power control and management may be "tapped" into a local area network 210 through, e.g., their respective control center devices 220. An automation network ("AN") is usually built on a publicly available standard formed of a set of high level communication protocols specifically designed for interfacing the automation network with networking-capable devices which is compliant with, or otherwise supports, the publically available standard. A ZIGBEE-based home automation network is an example of such an automation network 220. Hence, a control center device 220 for AN 220, on one hand, interfaces with LAN 210 as an in-network device 203, and on the other hand, builds AN 220 which provides home automation functionalities for participating power management devices (such as SPMU 100) paired to respective electronic devices in a home or office environment.

Thus, any power management device capable of interfacing with AN 220 may be tapped into AN 220. In one embodiment, an SPMU 100 is provided with an interfacing module capable of interfacing with one or more automation networks 220 tapped into a local area network 210. Thus, as illustrated, one or more SPMU 100s may be tapped into an automation network 220 tapped into the local area network 210.

Hence, as illustrated, a plurality of SPMUs 100 may be deployed in the local network environment 200 so that it can be remotely controlled or otherwise accessed by one or more client devices 201 via Internet 205. A deployed SPMU 100 may be tapped into LAN 210, AN 220 or both. If the deployed SPMU 100 (e.g. SPMU 100A) is only tapped into LAN 210, the deployed SPMU 100 may only be remotely controlled through LAN 210. If the deployed SPMU 100 (e.g., SPMU 100C or 100D) is only tapped into AN 220, the deployed SPMU 100 may only be remotely controlled through AN 220. If the deployed SPMU 100 (e.g., SPMU 100B) is tapped into both LAN 210 and AN 220, the deployed SPMU 100 may be remotely controlled through both LAN 210 and AN 220 (albeit via different interfaces, such as different graphical user interfaces (displayed either in a web browser or a smartphone app) used to control the deployed SPMU 100).

A client device 201 can be any computing device having networking capabilities and loaded with one or more client applications enabling a user to remotely control various aspects of an SPMU 100 as applicable to one or more electronic devices 25 paired (connected) to the SPMU 100, including an aspect of disconnecting power from, or supplying power to, the paired electronic device(s) 25 and other aspects of power control and management associated with the paired electronic device(s) 25 that are common to a conventional home automation system.

Each of these client devices 201 typically includes one or more processors (such as a microprocessor or microcontroller), one or more system memories, one or more communication modules (such as a network interface device, an RF unit, and antenna, or any combination thereof), one or more interface modules (such as a USB connector), one or more input modules (such as a keyboard, an input pointing means (such as a mouse, a touchpad, a touch screen, or any combination thereof), input keys, or any combination thereof), one or more storage modules (such as one or more various internal and external storage media (such as RAM, ROM, hard disk, smart card, flash memory) and any external storage accessible via, e.g., a communication module or an interface module), and one or more display modules (such as a display screen) which may serve as part of the input module if the display module includes a touch screen.

Examples of these client devices 201 may include smartphones, tablets, PDAs, desktop PC computers, and laptop computers. Typically, a user can either use a web browser or a non-browser custom software application to communicate with a target SPMU 100 either via LAN 210 or AN 220 (so as to remotely control various aspects of the paired electronic device(s) 25). A non-browser custom application running on a client device 201 is commonly referred to as an "app" when the client device is a smart mobile device such as a smart phone or a tablet PC. As used herein, the term "client application", so long as allowed by the context in which it is referred, may refer to any of a web browser or a non-browser custom software application.

Figure 3A:
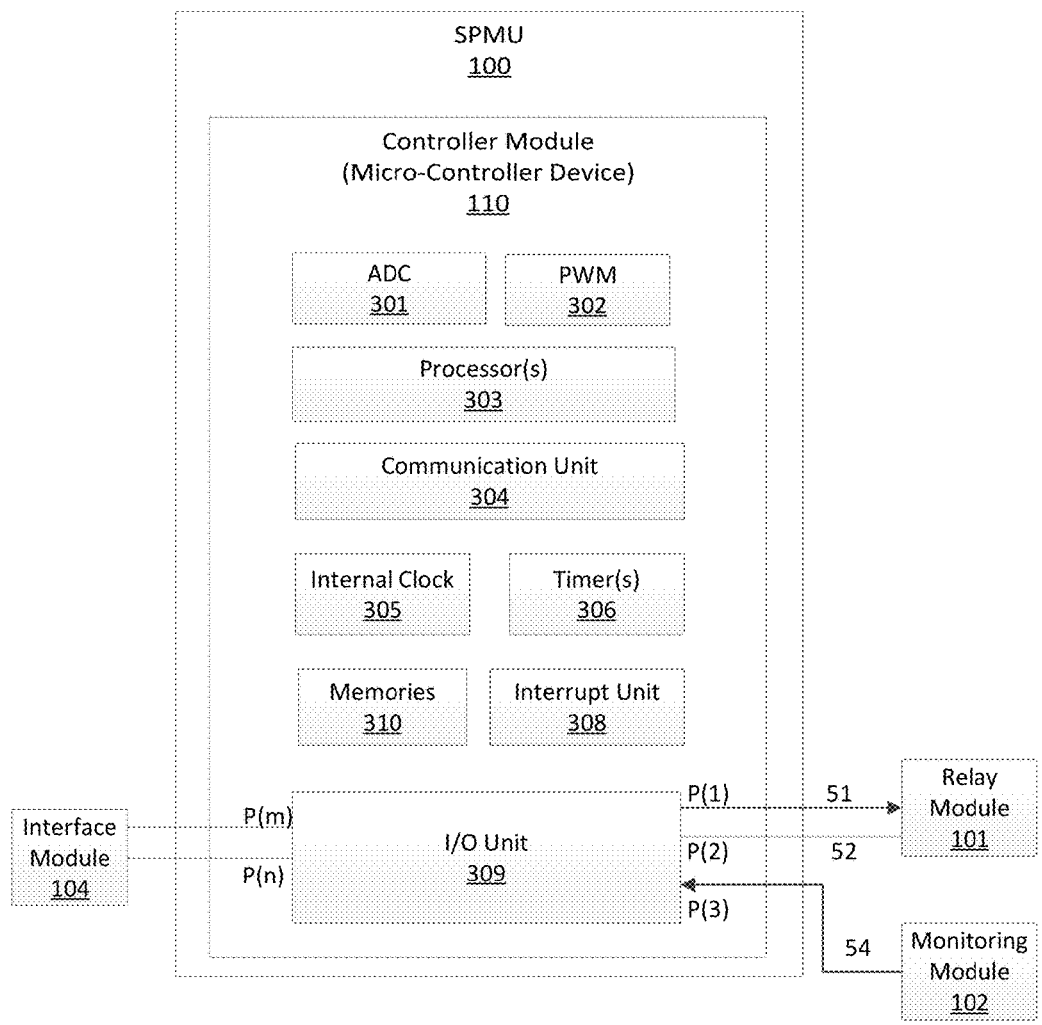
FIGS. 3A-B are block diagrams illustrating an exemplary controller module of the disclosed smart power management apparatus, according to one or more embodiments of the present disclosure.
Figure 3B:
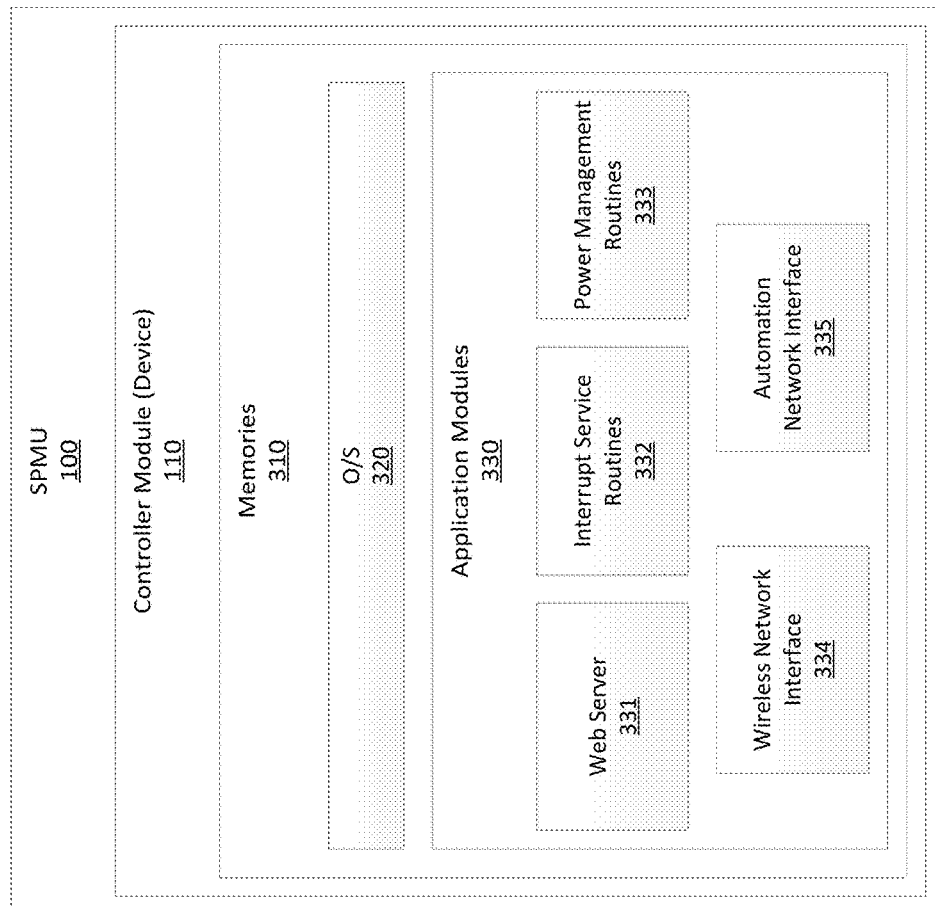

FIGS. 3A-B are block diagrams illustrating an exemplary controller module of the disclosed smart power management apparatus, according to one or more embodiments of the present disclosure.

Referring to FIG. 3A, which is a block diagram illustrating exemplary component modules of the controller module, controller module 110 may comprise an analog-to-digital (ADC) unit 301, a pulse-width-modulator (PWM) unit 302, a processor 303, a communication unit 304, an internal clock 305, one or more timer units 306, one or more memories 310, an interrupt unit 308 and I/O Unit 309.

ADC unit 301 is configured to receive one or more analog input signal (via, e.g., one or more input pins) and convert the one or more received analog input signals to digital output data, which are usually provided to and processed by processor 303. Processor 303 may be a microprocessor, and may be referred to as a CPU (central processing unit).

PWM unit 302 is configured to generate one or more signals of pulse-width-modulated (PWM) waveforms which may be outputted to one or more external devices through one or more output pins. As will be further disclosed, a signal of a PWM waveform, when working in concert with relay module 101 and monitoring-facilitator module 102, is used as a monitoring signal for monitoring whether manual switch 25-MS is opened or closed. Thus, PWM unit 302 may also be referred to as monitoring signal generator 302 or monitoring signal source 302.

In one implementation, PWM unit 302 may include multiple PWM channels each generating a PWM signal of a particular resolution (such as an 8-bit, 16-bit or 32-bit resolution). U.S. Pat. No. 6,182,235 (hereinafter simply referred to as "the '235 patent"), titled "Microcontroller with a user configurable pulse width modulator" and issued to Ma et al., describes a microcontroller incorporating multiple user configurable pulse width modulators. The entire disclosure of the '235 patent is hereby incorporated by reference. PWM unit 302 may include one or more control registers whose one or more bits may be set or cleared in configuring or otherwise controlling one or more aspects of generation of one or more PWM signals, aspects which may include the resolution, the frequency, and the duty cycle of a PWM signal to be generated.

Communication unit 304 is configured to provide networking capabilities. Communication unit 304 may include one or more communication devices, such as an RF unit, and antenna, or any combination thereof, as well as software or firmware modules, which, when executed by processor 303, drives or otherwise supports aforementioned one or more communication devices. In one implementation, communication unit 304 may include a Bluetooth-Low-Energy (BLE) compliant RF-based system-on-chip wireless communication device. In one implementation, communication unit 304 may include an IEEE 802.11 compliant wireless communication device.

Internal clock 305 and one or more timers 306 are configured to provide time information and timer functions as well as clock-based clock-triggered, time-based, and/or time-triggered, functions to other component modules of controller module 110. For example, PWM unit 302 may be implemented using or otherwise based on internal clock 305 and timers 306.

Interrupt unit 308 is configured to detect incoming interrupts and service an incoming interrupt by calling a specific software handling routine, often referred to as an interrupt service routine, based on, e.g., a pre-defined interrupt vector table. In particular, an interrupt can be triggered by various known hardware and software related conditions, such as a designated pin (of I/O unit 309) receiving a specific signal (e.g. having a specific signal level) from an external input line (connected to the pin).

I/O (Input/Output) unit 309 comprises a plurality of input and output pins. Some pins may be bi-directional and serve both as an input pin and an output pin. In one implementation, pin P(1) is configured to output to relay module 101 an analog or digital signal 51 indicative of whether the relay module should cut off power or conduct power. Pin P(2) is configured to output, as part of a monitoring path, a custom pre-configured analog or digital signal 52 (such as a PWM signal) which is designed to be received by load device 25 and subsequently cause load device 25 to generate a response signal 53 that can be used to detect whether there is a change in state of manual switch 25-MS. Pin P(3) is configured to receive, as part of a monitoring path, an analog or digital output signal 54 from monitoring-facilitator module 102, an output signal which can be used to monitor or otherwise detect a change in state of manual switch 25-MS. Additionally, one or more pins P(m) . . . P(n) are coupled to interface module 104 to receive and/or transmit one or more signals so as to enable interface module 104 to communicate and interact with controller module 110.

Memories 310 store both software or firmware programs and data used by software or firmware programs when they are executed by processor 303. In the present disclosure, memories 310 must be construed broadly to encompass various local and remotely accessible storage means, so long as those storage means store programs and/or data which can be loaded into processor 303 when needed. Thus, memories 310 may comprise local volatile and non-volatile storage means—which may include registers, RAM, SRAM, DRAM, cache memory, EPROM, EEPROM, ROM, hard disk, and flash memory—as well as distributed (remotely) accessible storage means.

Software or firmware modules (as stored in memories 310), when executed by processor 303, are adapted to perform various functions for which their respective software codes are programmed. As used herein, the terms "application", "application module", "software", "software program", "software module", "programmatic module", "code", "application code", "programmatic code", "object", "programmatic object", "script", "routine", "service routine", "processing logic", and other terms similar thereto or derived therefrom, when allowed or required by context, may be used interchangeably to refer to one or more sets of computer instructions adapted to perform, when executed by a processor, one or more specific functions.

FIG. 3B is a block diagram illustrating exemplary software or firmware modules stored in memories 310, which may be loaded into and executed by processor 303 to perform functions relating to smart power management and control. Referring to FIG. 3B, software or firmware modules stored in memories 310 may include operating system 320 and a plurality of application modules 330. In one embodiment, application modules 330 may include one or more web server modules 331, one or more interrupt service routines 332, one or more power management routines 333, one or more wireless network interface modules 334, and one or more automation network interface modules 335.

Web server modules 331 may be programmed and configured to receive requests (such as web requests) from a client application (such as a web browser or a custom smartphone app) of a client device 201, call one or more corresponding application modules 330 (such as power management routines 333) to handle the received request, and deliver a corresponding response (such as a web response) to the requesting client application. In one implementation, web server modules 331 include a web server application 331 (hereinafter simply referred to as "web server 331"), which, when executed, runs as a background server 331 constantly listening, accepting and handling incoming power management related web requests.

Interrupt service routines 333 are application modules each triggered by an occurrence or otherwise a reception of an interrupt so as to handle the occurrence or otherwise the reception of the interrupt. An interrupt service routine (ISR) may collect data (parameters) associated with the triggered interrupt and call one or more corresponding application modules 330 (such as power management routines 333) to handle the interrupt. In a multi-thread environment, an ISR, when triggered, is often executed in a thread separate from the main thread (of, e.g., a main process) executing a well-known main routine of controller module 110. The main process may await one or more execution results of the ISR (which may be indicated by one or more values of corresponding one or more flags stored in a register or otherwise in memories 310), and perform control flow based on the execution results when the execution results become available.

Power management routines 330 are application modules executing business logics of power control and management as related to the present disclosure. Each power management routine 330 is usually called by other application modules (such as ISRs 332 and web server routines 331) with input parameters provided by the calling modules. In one implementation, power management routines 330 may include a well-known main routine executed by a main process of controller module 110. The main routine may include a main logic-processing loop constantly processing logics required or otherwise needed to keep SPMU 100 "smart" and functional.

Wireless network interface modules 334 are application modules interfacing with a wireless network provider (such as a wireless router 210) based on one or more standard or proprietary networking protocols (such as IEEE 802.11 based WiFi protocols). For the ease of discussion, wireless network interface modules 334 may also be referred to as WiFi modules 334. On one hand, Interfacings with the network provider through WiFi modules 334 enable SPMU 100 to join a wireless communication network (such as a WiFi-based wireless LAN established by wireless router 210) provided by the network provider. On another hand, Interfacings with the network provider through WiFi modules 334 also enable the network provider to apply different network configurations to SPMU 100 in accordance with different needs of SPMU 100 relating to, e.g., security, connectivity, remote access, and so on.

In one implementation, upon joining a WiFi-based LAN 210 through WiFi modules 334, SPMU 100, when properly configured using known configurations, may be accessible to a client device 201 via Internet through LAN 210 and gateway 202. As one example, a client device 201 may, via a client application, remotely operate SPMU 100 to perform power management functions by sending a web request to a web address configured to reach the aforementioned web server 331 (which, in essence, acts as a web site for SPMU 100). Such a web address can be configured using the public IP address assigned to gateway 202 and a network logical port assigned to SPMU 100 through, e.g., a known port-forwarding configuration.

Web server 331, upon receiving the web request, may respond to the web request by sending instructions (such as HTML or XML codes) configured to enable the client application to display one or more graphical user interfaces (GUIs), which are configured to enable a user of the client device to operate SPMU 100 by sending one or more operation requests to web server 331 acting on behalf of SPMU 100. Upon receiving an operation request, web server 331 may call one or more power management routines 333 to perform one or more power management operations as intended by the operation request. Web server 331 may then send back to the client application a result status of the intended operation(s) so that the client application may display the result status for the user to view.

Automation network interface modules 335 are application modules interfacing with an existing home or office automation network 220 (such as a ZIGBEE automation network) based on a set of pre-defined protocols used to define or otherwise establish the automation network 220. Interfacings with the existing automation network enable SPMU 100 to register itself with the automation network and become tapped into the automation network 220 (which is already tapped into LAN 210 through its own WiFi modules). This enables a client device 201 to remotely operate SPMU 100 (to perform different power management functions) through a control center 220 of the automation network 220.

In one implementation, to remotely operate SPMU 100, a user of a client device 201 may, via a client application of the client device 201, first communicate with the control center 220 of the automation network 220 so as to get access to a first set of GUIs (such as a set of web pages or a set of custom GUIs) displayed on the client device and configured to enable the user to access a plurality of smart power management devices tapped into the automation network. The user may then locate SPMU 100 on one or more GUIs of the first set of GUIs, and get access to a second set of GUIs specifically directed to SPMU 100. The second set of one or more GUIs are usually configured to let the user operate SPMU 100 by sending the control center 220 one or more operation requests directed to SPMU 100.

Upon receiving an operation request directed to SPMU 100, the control center 220 communicates with SPMU 100 via an automation network interface module 335 of SPMU 100 using the pre-defined set of protocols defining the automation network 220, and may then relay the received operation request directed to SPMU 100 to one or more automation network interface modules 335. The one or more automation network interface modules 335, upon receiving the operation request, may call one or more power management routines 333 to perform one or more power management operations as intended by the operation request. The automation network interface module 335 may then send back to the control center 220 a result status of the one or more intended operations, so that the control center 220 may relay the result status back to the client application for the user to view.

In one embodiment, web server modules 331 may be optional, and may not be included in Application modules 330, if SPMU 100, e.g., is only designed to be tapped into an automation network 220. In one embodiment, automation network interface modules 335 may be optional, and may not be included in Application modules 330, if SPMU 100, e.g., is only designed to be remotely operated via its own web server modules 331. In one embodiment, both WiFi modules 334 and web server modules 331 are optional, and neither is included in Application modules 330, if SPMU 100, e.g., is only designed to be tapped into an automation network 220.

In one embodiment, controller module 110 may be implemented using a microcontroller, such as a commercial off the self (COTS) microcontroller, like an Atmel AVR microcontroller of a chosen bit size (such as 8-bit, 16-bit, or 32-bit) or Texas Instrument TI CC2541 System-on-Chip microcontroller. In another embodiment, controller module 110 may be implemented using a combination of a main microcontroller and one or more separate functional modules implementing one or more component modules of the controller module. For example, in one implementation, controller module 110 may include a monitoring signal generator 302 separate from the main microcontroller. In this implementation, monitoring signal generator 302 may be connected to the main microcontroller and controlled by the main microcontroller via one or more control signals received from the main microcontroller. Monitoring signal generator 302 may, under the control of the main microcontroller, generate a monitoring signal 52 and supply the generated monitoring signal 52 to relay module 101 such that the monitoring signal 52 can be used to detect whether manual switch 25-MS is opened or closed and/or whether there is a change in state of manual switch 25-MS.

Figure 4:
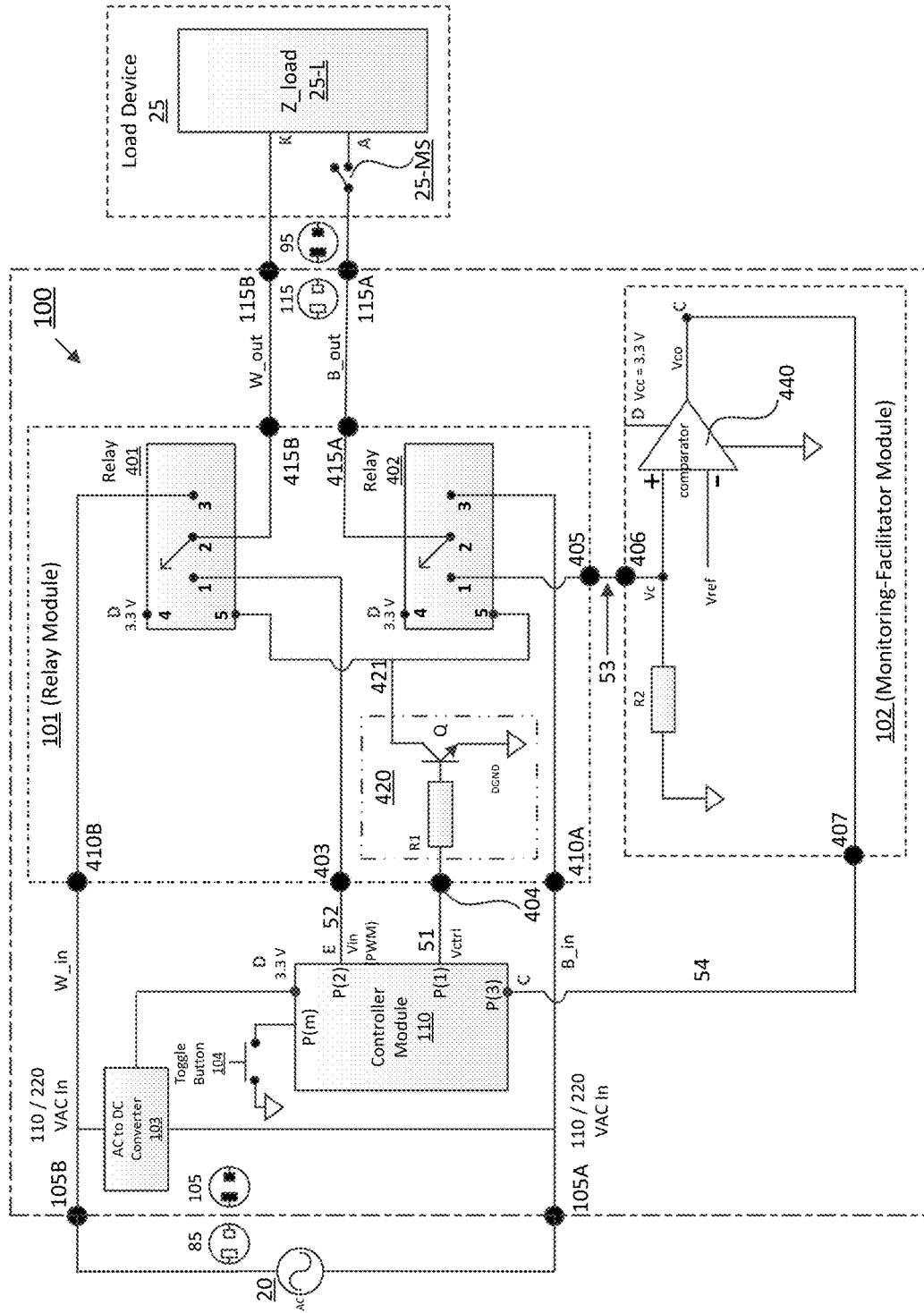
FIG. 4 is a simplified schematic diagram illustrating an exemplary implementation of the disclosed smart power management apparatus and method, according to one or more embodiments of the present disclosure.

FIG. 4 is a simplified schematic diagram illustrating an exemplary implementation of the disclosed smart power management apparatus and method, according to one or more embodiments of the present disclosure.

AC to DC converter 103 receives incoming A/C power (via W_in and B-in wires) and converts a standard DC power of 3.3 volts from the received A/C power using known AC to DC technologies. The generated standard 3.3-volt DC is supplied to other component modules of SPMU 100 (such as relay module 101, controller module 110, and monitoring-facilitator module 102) using known wiring techniques, so as to provide those component modules with DC power necessary for their respective normal operations.

Relay module 101 (and thus SPMU 100) is positioned between incoming A/C power and load device 25 (including its Z_load 25-L and manual switch 25-MS) and upstream, power-supplying-wise, to load device 25, and therefore is in a position to control the supplying of incoming A/C power to load device 25. Relay module 101 is, in essence, the power supplier of load device 25. Hence, when relay module 101 cuts off power from the A/C source to load device 25, Z_load 25-L (of load device 25) does not get energized regardless of whether manual switch 25-MS (of load device 25) is in an open state (to disconnect power) or a closed state (to conduct power). Thus, in a first aspect, relay module 101, like a conventional relay, is coupled to AC power input terminal 105 of SMPU 100 (e.g., via AC power input terminal 410 thereof) to receive incoming A/C power, coupled to AC power output terminal 115 of SMPU 100 (e.g., via AC power output terminal 415 thereof) to output received A/C power, and configured to either conduct (connect) incoming power to load device 25 or cut off (disconnect) incoming power from load device 25.

In a second aspect, when switched to disconnect incoming power from load device 25, relay module 101, unlike a conventional relay, is simultaneously configured to receive a monitoring signal 52, and act as an intermediary connector device to electrically couple load device 25 (including Z_load 25-L and manual switch 25-MS) to monitoring-facilitator module 102 so as to form a monitoring path, through which monitoring signal 52 can be received by load device 25 and cause load device 25 to output a response signal 52 that can be used to monitor or otherwise detect a change in state of manual switch 25-MS.

To meet both the first and second aspects, relay module 101 cannot be directly implemented using a single conventional relay only designed to meet the first aspect. In one embodiment, as illustrated, relay module 101 uses a pair of conventional relays 401 and 402 configured in such a manner that meets both the first and second aspects. Each of relays 401 and 402 may be a conventional relay having nodes configured to operate the relay in one of at least two states (namely, "ON" and "OFF") at one time. Power PCB Relay RT1 of the "Potter & Brumfield" brand from the TE Connectivity Ltd. company is one example conventional relay that can be used to implement each of relays 401 and 402.

In one exemplary implementation, for each of relays 401 and 402, among its nodes, node 4 is configured to receive a standard DC power (such as a standard 3.3-volt DC power supplied by AC to DC converter 103); node 5 (control node) is configured to receive (from, e.g., controller module 110) a control signal 51 indicating (or otherwise indicative of) a state in which the relay should be operated according to an operating mode of SPMU 100; node 2 (anchor node) is configured to be coupled to an output connector of AC power output terminal 115 of SMPU 100 via a corresponding output connector of AC power output terminal 415 of relay module 101; node 3 is configured to be coupled to an input connector of AC power input terminal 105 of SPMU 100 via a corresponding input connector of AC power input terminal 410 of relay module 101; and node 1 (an input node) is either configured to receive a monitoring signal 52, or configured to be coupled to monitoring-facilitator module 102 so as to form a monitoring path through which monitoring signal 52 can be received by load device 25 and subsequently cause load device 25 to generate a corresponding response signal 53 that can be used to monitor or otherwise detect a change in state of manual switch 25-MS.

Thus, in the exemplary implementation, respective nodes 4 of relays 401 and 402 are both configured to receive a standard 3.3-volt DC power from AC to DC converter 103 so as to receive DC power needed for their respective normal operations. Respective nodes 5 of relays 401 and 402 are both configured to be coupled to pin P(1) of controller module 110 (via, e.g., terminal 404 of relay module 101 coupled to an intermediate circuit 420 of relay module 101 comprising a resister R1 and a switch Q) to receive control signal 51 (indicating or otherwise indicative of an intended operating mode of relay module 101). Nodes 3 of relays 401 and 402 are respectively coupled to input nodes 410B and 410A of AC power input terminal 410 of relay module 101, which are respectively coupled to input connectors 105B and 105A of AC power input terminal 105 of SPMU 100 (which are coupled to corresponding output connectors of output terminal 85 of AC source 20 to receive incoming AC power). Nodes 2 of relays 401 and 402 are respectively coupled to output nodes 415B and 415A of AC power output terminal 415 of relay module 101, which are respectively coupled to output connectors 115B and 115A of AC output terminal 115 of SPMU 100 (which are coupled to corresponding input connectors of input terminal 95 of load device 25 ordinarily used by load device 25 to receive power). Node 1 of relay 401 (the upper relay) is coupled to pin P(2) of controller module 110 to receive (from, e.g., a monitoring signal generator 302 of controller module 110) a monitoring signal 52 via terminal 403 of relay module 101, and node 1 of relay 402 (the lower relay) is coupled to monitoring-facilitator module 102 (via, e.g., terminal 405 of relay module 101 coupled to monitoring-facilitator module 102 via its corresponding terminal 406) to realize a monitoring path (when relay module 101 operates in the monitor mode).

With the exemplary implementation of relay module 101 illustrated in FIG. 4, where incoming control signal 51 whose signal level (or pattern) $V_{ctrl}$ (which, e.g., is going "high" by voltage, or equal to a "1" by digital value) indicating that SPMU 100 be operating in the operation mode—which is the operating mode in which relay module 101 is configured to conduct incoming power to load device 25—for each of relays 401 and 402, control signal 51, via intermediate circuit 420 (which, e.g., comprises resister R1 and switch Q,) causes the relay to receive at its node 5 a corresponding drive signal 421 configured to cause its node 2 to be electrically connected to its node 3 (an input node) and electrically disconnected from its node 1.

In other words, intermediate circuit 420 is included in relay module 101 to receive a control signal 51 indicating or otherwise indicative of a particular operating mode (e.g. "operation mode" or "monitor mode"), as well as to, for each of relays 401 and 402, "translate" (convert) the received control signal 51 to one or more corresponding output drive signals 421 configured to cause the relay to be set to a specific state according to the pre-set intention of control signal 51. Hence, intermediate circuit 420 may be implemented with a different configuration from the one exemplified in FIG. 4, when, e.g., control signal 51 is structured differently from the exemplary control signal 51 (noted above in connection with the exemplary configuration of intermediate circuit 420 shown in FIG. 4), and/or relays 401 and 402 are ones of different configurations or constructions.

As one example, unlike the exemplary configuration of intermediate circuit 420 shown in FIG. 4 (which only outputs one signal line coupled to both respective nodes 5 of relays 401 and 402), intermediate circuit 420 may, in another implementation, be configured to output two different signal lines each outputting a different drive signal, with one signal line coupled to node 5 of relay 401 and the other signal line coupled to node 5 of relay 402, if, e.g., relays 401 and 402 are ones either of different structures (constructions) or of different configurations.

As another example, if a control signal 51 is instead structured to go "low" by voltage (or, in other words, structured to be equal to digital "0" by digital value) to indicate that relay module 101 be operating in the operation mode—a structure (polarity) which is the exact opposite of that of the exemplary control signal 51 noted above in connection with the exemplary configuration of intermediate circuit 420 shown in FIG. 4—then, assuming that relays 401 and 402 are still the same ones as the exemplary ones shown in FIG. 4, intermediate circuit 420 may be of a another configuration different from the exemplary configuration shown in FIG. 4, so long as that different configuration enables intermediate circuit 420 to "translate" (convert or transform) control signal 51 (having the opposite polarity from the polarity of the exemplary control signal 51) to the same corresponding output drive signal 421 (coupled to and driving both respective nodes 5 of relays 401 and 402) as the one outputted by the exemplary configuration of intermediate circuit 420.

This operation mode configuration results in the upper relay 401 conducting power (from A/C source 20) to load device 25 through the white "neutral" wire (including W_in and corresponding W_out) via input node 410B (of input terminal 410) and output node 415B (of output terminal 415), as well as the lower relay 402 conducting power (from A/C source 20) to load device 25 through the black "hot" wire (including B_in and corresponding B_out) via input node 410A (of input terminal 410) and output node 415A (of output terminal 415), thereby enabling load device 25 to receive power via its input connectors of input terminal 95. As a skilled artisan appreciates, under this operation mode configuration, a human retains the control of the energizing or de-energizing of Z_load 25-L of load device 25 through operating the manual switch 25-MS of load device 25, since the energizing or de-energizing of Z_load 25-L, under this configuration, is entirely dependent on the state of manual switch 25-MS.

Where incoming control signal 51 has a signal level $V_{ctrl}$ (which may be going "low" by voltage, or equal to "0" by digital value) indicating that SPMU 100 be operating in the monitor mode—which is the operating mode in which relay module 101 is configured to cut off incoming power from load device 25 while simultaneously enable monitoring-facilitator module 102 to monitor the state of manual switch 25-MS or whether there is a change in state of manual switch 25-MS—for each of relays 401 and 402, control signal 51, via the intermediate circuit 420, causes the relay to receive at its node 5 a corresponding drive signal 421 configured to cause its node 2 to be electrically connected to its node 1 and electrically disconnected from its node 3.

This monitor mode configuration results in both the upper relay 401 and the lower relay 402 disconnecting incoming power from load device 25 by disconnecting their respective input A/C wires from their respective output AC wires. Namely, by disconnecting its node 2 from its node 3, the upper relay 401 disconnects its input white ("neutral") AC wire from its output white AC wire (coupled to load device 25 via output node 415B), thereby disconnecting incoming power from load device 25 through disconnecting the white "neutral" path otherwise required to conduct power. By disconnecting its node 2 from its node 3, the lower relay 402 disconnects its input black ("hot") AC wire from its output black AC wire (coupled to load device 25 via output node 415A), thereby disconnecting incoming power to load device 25 through disconnecting the black "neutral" path otherwise required to conduct power. Thus, such a configuration results in relay module 101, as a whole, cutting off incoming power from load device 25.

As a skilled artisan appreciates, this "monitor mode" configuration, in the aspect of disconnecting incoming power from the paired load device 25, is usually referred to as a "disconnect mode" configuration applicable to the conventional art of a host power management device in the sense that this is a configuration resulting in the de-energizing of Z_load 25-L of load device 25 regardless of the contemporaneous state of manual switch 25-MS of load device 25. Thus, contrasting to the "operation mode" configuration, under a "disconnect mode" configuration, a human would undesirably lose the control of energizing Z_load 25-L of load device 25 through operating manual switch 25-MS of load device 25 when the human does not have a convenient access to a client computing device 201 configured to remotely control the host power management device. This undesirable dilemma cannot be reverted unless a host power management device has a way to enable the human to regain this desirable control through the manual switch of the load device. In the conventional art, the only way (to enable the human to regain this desirable control) which a host smart power management device may provide is, as noted above, using a toggle switch provided on the assembly of the host power management device. However, using such a conventional way (to enable a human to regain this desirable control) is, as described above, often very inconvenient for a lay human.

That the "disconnect mode" configuration is, in the present disclosure, now referred to as the "monitor mode" configuration is, as will be further disclosed, due to how a disclosed SPMU 100 provides an advantageous way to enable the human to regain this desirable control (of energizing Z_load 25-L of load device 25 through operating manual switch 25-MS of load device 25) without any need for the human to go through the afore-described inconveniences imposed thereon by the conventional toggle-switch way.

Specifically, unlike any conventional "disconnect mode" configuration, the "monitor mode" configuration of relay module 101, in addition to letting relay module 101 cut off incoming power from load device 25, is also instrumental in forming a monitoring path configured to continuously monitor or otherwise detect a change in state of manual switch 25-MS. As noted above, for both relays 401 and 402, their respective nodes 2 are coupled to corresponding input connectors of input terminal 95 of load device 25 via respective output nodes 415B and 415A (of output terminal 415). With the monitor mode configuration, for upper relay 401, its node 2 is switched to be electrically coupled to its node 1, thus becoming configured to receive a continuous monitoring signal 52 from controller module 110 acting as a signal generator. For lower relay 402, its node 2 is switched to be electrically coupled to node 1, thus becoming configured to be electrically coupled to monitoring-facilitator module 102. This configuration, in effect, forms a serial path, as part of a monitoring means, between the signal generator of continuous monitoring signal 52 and monitoring-facilitator module 102 through load device 25 (including Z_load 25-L and manual switch 25-MS) via relay module 101. An output signal 54 of monitoring-facilitator module 102 is supplied to controller module 110 to enable controller module 110 to continuously monitor or otherwise detect a change in state of manual switch 25-MS.

As will be further disclosed, the monitoring path is configured to use monitoring signal 52 and monitoring-facilitator module 102 to produce a monitoring facilitator signal 54 to facilitate the monitoring of or otherwise detecting of a change in state of manual-switch 25-MS. And through the monitoring path, controller module 110 is able to monitor or otherwise detect a change in state of manual switch 25-MS based on the monitoring facilitator signal 54 supplied to controller module 110 by monitoring-facilitator module 102, and advantageously perform control operations to enable a lay human to regain the aforementioned desirable control of energizing or de-energizing Z_load 25-L of load device 25 through operating manual switch 25-MS of load device 25 without any need for the lay human to go through the inconveniences imposed thereon by the conventional "toggle-switch" way.

As exemplified in FIG. 4, relay module 101 may be implemented using a two-relay based configuration so as to achieve the aforementioned first and second aspects thereof. As a skilled artisan appreciates, relay module 101 may also be implemented using one or more of other relay configurations, such as a four-relay based configuration, without departing from the spirit and the scope of the present disclosure, so long as the used relay configuration manages to achieve the same first and second aspects thereof.

Turning to monitoring-facilitator module 102, as illustrated, one exemplary monitoring-facilitator module 102, which is constructed in accordance with or otherwise based on monitoring signal 52, may be implemented as simple as using a comparator 440 coupled to a resister R2 at an input terminal 406 receiving a monitoring response signal 53 from load device 25 through the monitoring path established via relay module 101 (for monitoring manual switch 25-MS) when relay module 101 is switched to the aforementioned exemplary "monitor mode" configuration.

Specifically, with the establishing of the monitoring path, load device 25 receives monitoring signal 52 as an input signal through an incoming portion of the monitoring path that includes the nodes 1 and 2 of the upper relay 401 of relay module 101 as well as nodes 415B and 115B. Schematically, as illustrated, load device 25 can be represented by its internal load Z_load 25-L connected in series with manual switch 25-MS, which controls the current flowing through Z_load 25-L. Thus, load device 25, as an electronic device, may naturally respond to the input monitoring signal 52 by generating and outputting a natural response signal 53 (hereinafter referred to as "monitoring response signal 53"). As shown, monitoring response signal 53, through an outgoing portion of the monitoring path that includes nodes 115A and 415A and nodes 2 and 1 of the lower relay 402 and terminal (node) 405 of relay module 101, may then be received by monitoring-facilitator module 102 via its input terminal (node) 406.

As noted, one objective of creating a "monitor mode" configuration—for example, establishing a monitoring path through which load device 25 can receive a custom preconfigured monitoring signal 52 and generate a monitoring response signal 53—is to be able to detect a change in state of manual switch 25-MS (supposedly resulting from or otherwise caused by deliberate human action). A skilled artisan appreciates that this objective may be achieved when monitoring response signal 53, as a result of load device 25 responding to or otherwise reacting to monitoring signal 52, exhibits (in its waveform) one or more waveform patterns indicative of any change or changes in state of manual switch 25-MS (as the change or changes occur).

In other words, in achieving the objective of being able to detect a change in state of manual switch 25-MS, monitoring signal 52 can be implemented by any signal 52 so long as that signal 52 can cause load device 25 (receiving that signal 52 as an input) to output a response signal 53 exhibiting one or more waveform patterns which are indicative of any change or changes in state of manual switch 25-MS (as the change or changes occur). Thus, monitoring signal 52 may be implemented in various different ways. As will be illustrated below, one exemplary implementation of monitoring signal 52 is a PWM signal of equal 50% duty cycle and of an appropriate frequency, which is commonly provided or otherwise configurable in commercial off the shelf (COTS) microcontrollers. Such as PWM signal is often referred to as a "square-wave" signal due to the shape of its waveform.

Monitoring-facilitator module 102 is a configuration provided in accordance with anticipated one or more waveform patterns of a monitoring response signal 53 (which monitoring-facilitator module 102 receives as an input signal) indicative of any change or changes in state of manual switch 25-MS (as the change or changes occur) to facilitate the monitoring or otherwise detecting a change in state of manual switch 25-MS (as such a change-in-state occurs). More specifically, waveform patterns of a monitoring response signal 53 that are indicative of any change or changes in state of manual switch 25-MS may be "raw" in the sense that the waveform patterns may include a non-trivial number of variations that are not straightforward, simplified, or otherwise normalized enough to be used (by, e.g. hardware and/or software of controller module 110) for monitoring or otherwise detecting a change in state of manual switch 25-MS. Such a raw response signal, although indicative of one or more changes in state of manual switch 25-MS, may require complex software algorithms to analyze to its waveform patterns in order to accurately and reliably identify one or more changes in state of manual switch 25-MS indicated therein. Thus, in one implementation of SPMU 100, a monitoring-facilitator module 102 may be provided and configured to generate a monitoring facilitator signal 54 (based on the monitoring response signal 53) structured to facilitate the monitoring or otherwise detecting of a change in state of manual switch 25-MS by controller module 110. Also, although a monitoring-facilitator module 102 is shown in FIGS. 1 and 4 as provided separate from controller module 104, a monitoring-facilitator module 102 may be integrated into or otherwise incorporated into controller module 110.

In an alternative implementation of SPMU 100, monitoring-facilitator module 102 may not be needed and thus may be optional, when monitoring response signal 53 is directly supplied to controller module 110 (without the use of any monitoring-facilitator module 102) for controller module 110 to analyze the waveform (patterns) thereof, so that controller module 110 may be able to monitor or otherwise detect a change in state of manual switch 25-MS using custom software algorithms. These custom software algorithms (as required for an implementation of SPMU 100 without the use of any monitoring-facilitator module 102), if implementable, are usually relatively more complex or even significantly more complex than algorithms otherwise needed for an implementation of SPMU 100 where monitoring-facilitator module 102 is provided and used.

In one implementation, monitoring-facilitator module 102 is configured to simplify, normalize, or otherwise transform one or more monitoring response signals 53 to one or more corresponding monitoring facilitator signals 54 which are indicative of a change in state of manual switch 25-MS, while simplified or normalized enough to be used (by, e.g. hardware and/or software of controller module 110) for the purpose of monitoring or otherwise detecting a change in state of manual switch 25-MS. Hence, in this implementation, monitoring response signal 53 and monitoring facilitator signal 54 may each be considered as a response signal to monitoring signal 52, with signal 53 being a natural response signal and signal 54 being a normalized or otherwise transformed response signal.

Since monitoring-facilitator module 102 is configured to generate a monitoring facilitator signals 54 based on the anticipated one or more waveform patterns of a monitoring response signal 53 so as to facilitate or otherwise enable a controller module (e.g., controller module 110) to identify a change in state of manual switch 25-MS as indicated in monitoring response signal 53, monitoring-facilitator module 102, given a custom pre-configured monitoring signal 52, may be implemented in various different ways. The simple implementation of monitoring-facilitator module 102 illustrated in FIG. 4 is merely one exemplary implementation configured in accordance with a monitoring signal 52 which is implemented by a square-wave PWM signal.

Figure 5:
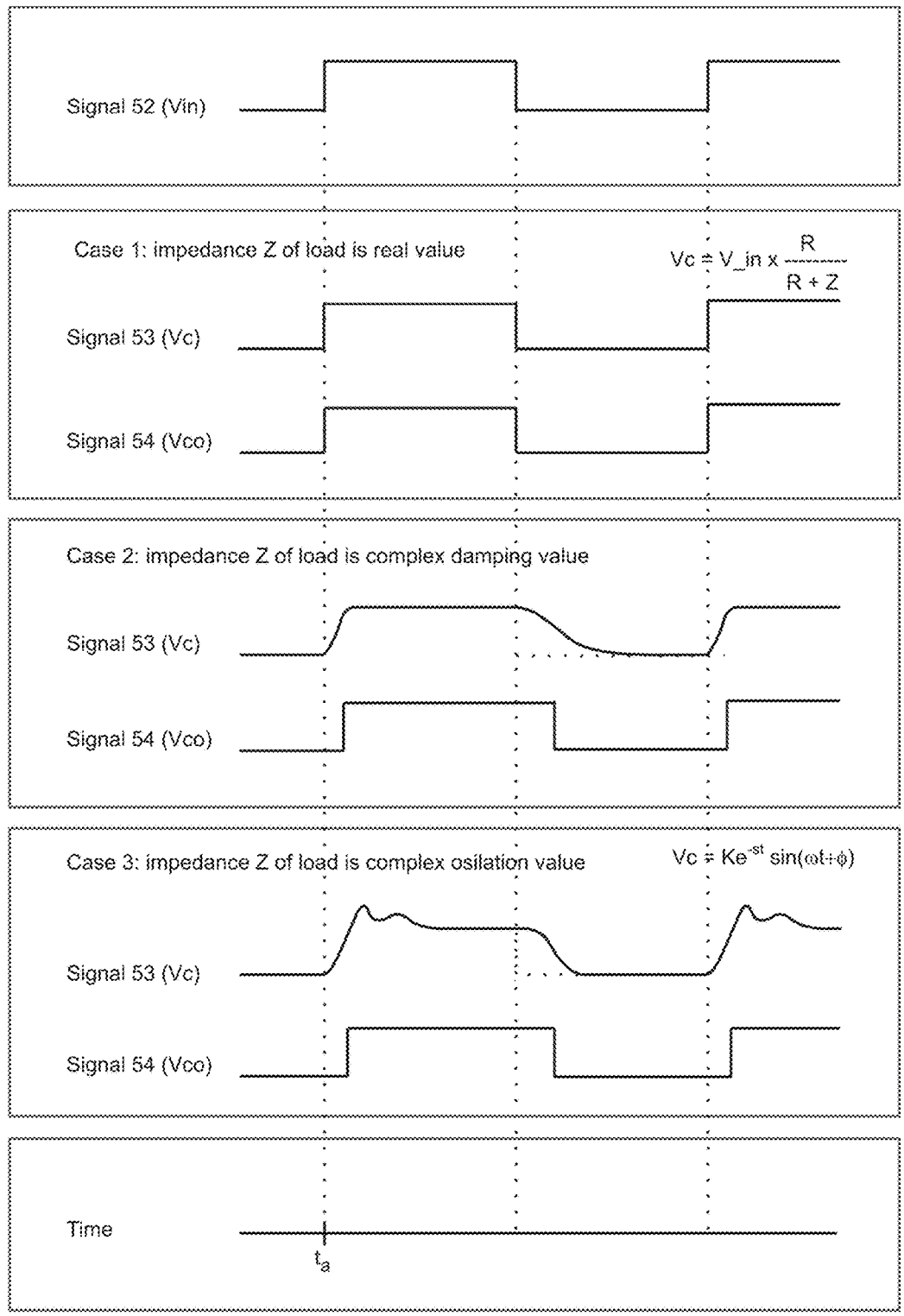
FIG. 5 is a set of pictorials illustrating simplified waveforms of a monitoring response signal 53 and a monitoring facilitator signal 54 for different use cases associated with Z_load 25-L in the scenario where manual switch 25-MS is in the "closed" state, given an exemplary PWM monitoring signal 52 and an exemplary configuration of monitoring-facilitator module 102, according to one or more embodiments of the present disclosure.

FIG. 5 is a set of pictorials illustrating simplified waveforms of an exemplary monitoring signal 52 as well as corresponding simplified waveforms of a monitoring response signal 53 and a monitoring facilitator signal 54 for different use cases associated with Z_load 25-L in the scenario where manual switch 25-MS is in the "closed" state.

Specifically, the exemplary implementation of monitoring signal 52 shown in FIG. 5 is a pulse-width-modulation (PWM) signal having equal duty cycles of 50% of an appropriate frequency. A PWM signal of a different duty cycle may also be used to implement monitoring signal 52. Hereinafter, for illustration and not limitation and for the ease of discussion, monitoring signal 52 may also be referred to as PWM signal 52.

As illustrated, when manual switch 25-MS is in the closed state, the aforementioned monitoring path—a series path which includes the aforementioned incoming portion coupled to load device 25 (including Z_load 25-L and manual switch 25-MS of load device 25), the aforementioned outgoing portion coupled to load device 25, and monitoring-facilitator module 102—has an electrical current conduction path to ground through resistor R2 of monitoring-facilitator module 102. In FIG. 5, a simplified waveform of PWM signal 52 is illustrated in the form of switching voltage V_in of PWM signal 52. Thus, when PWM signal 52 is transmitted to load device 25 through the incoming portion of the monitoring path (from. e.g. pin P(2) of controller module 110 via terminal 403 of relay module 101), the switching voltage V_in is applied onto Z_load 25-L in accordance with the periodical switching waveform of voltage V_in.

A response to the application of the switching voltage V_in of PWM signal 52 onto Z_load 25-L, may be dissected under three different use cases relating to impedance Z of Z_load 25-L. Namely, use case 1 is where impedance Z is a real value; use case 2 is where impedance Z is a complex damping value; and use case 3 where impedance Z is a complex oscillation value. FIG. 5 also shows, for each of the three different use cases, simplified waveforms of monitoring response signal 53 and monitoring facilitator signal 54—which, as noted above, are both generated in response to the application of the switching voltage V_in of PWM signal 52 onto Z_load 25-L—in the form of voltages Vc and Vco at input terminal 406 and output terminal 407 of monitoring-facilitator module 102, respectively. These waveforms of monitoring response signal 53 and monitoring facilitator signal 54 correspond to, or otherwise result from, the exemplary configuration of monitoring-facilitator module 102 illustrated in FIG. 4.

Specifically, the application of the switching voltage V_in of PWM signal 52 onto Z_load 25-L results in a complex current flowing in the aforementioned conduction path. When voltage V_in of PWM signal 52 transitions from "low" (e.g., 0 volt) to "high" (e.g., 3.3 volts) and then stays high during an "ON" time interval of PWM signal 52, the complex current is usually non-zero, resulting in, for all three use cases, voltage Vc of monitoring response signal 53 at terminal 406 of monitoring-facilitator module 102, as illustrated in FIG. 5, rising from "low" to high" (albeit at respectively different rising rates) and staying "high" during the "ON" time interval of PWM signal 52.

When voltage V_in of PWM signal 52 transitions from "high" to "low" and then stays "low" during an "OFF" time interval of PWM signal 52, the complex current may have a decaying sinusoidal waveform, which may be expressed as:

$$i(t) = kVe^{-\alpha t} * \sin(\omega t + \theta) \qquad \text{Equation (1.1)}$$

Where:
k is the amplitude (e.g., $k=|V_{in}*R/R+Z|$, where Z is the impedance of Z_load 25-L and R is resistance of resistor R2);
s is decay factor (e.g., $s=1/C$, if Z has capacitance C);
$\omega$ is angular frequency (e.g., $\omega=1/\sqrt{L*C}$ if Z has inductance L and capacitance C);
$\theta$ is a phase value (e.g. $\theta=\arc(B/A)$, where $Z=A+jB$).

This decaying sinusoidal waveform of the complex current results in, for all three use cases, voltage Vc of monitoring response signal 53, as illustrated in FIG. 5, decaying (or otherwise dropping) from "high" to "low" during the "OFF" time interval of PWM signal 52, albeit at respectively different decaying rates.

As shown in FIG. 4, for the exemplary configuration of monitoring-facilitator module 102, comparator 440 is provided therein to output at its output node, and thus also at terminal 407 of monitoring-facilitator module 102 coupled to its output node, monitoring facilitator signal 54 whose waveform may be represented as the waveform of voltage Vco at terminal 407. In particular, terminal 406 of monitoring-facilitator module 102, whose voltage Vc represents monitoring response signal 53, is fed into the "V+" input terminal of comparator 440, while "V−" input terminal of comparator 440 is coupled to Vref. In this implementation, Vref is a reference voltage of comparator 440. Thus, if input Vc of signal 53 is above Vref, then comparator 440 outputs Vco having the signal level representing digital "1"; and if input of Vc of signal 53 is below Vref, then comparator 440 outputs Vco having the signal level representing "0".

Vref may be set based on the anticipated range of Vc of monitoring response signal 53, which is generated based on monitoring signal 52. Thus, in one example, if the anticipated range of Vc of monitoring response signal 53 is between zero volt and N volt (where N is a positive real number), Vref may be set to a voltage value between zero volt (which is ground) and N volt. In one implementation, by way of example and not limitation, the anticipated range of Vc of monitoring response signal 53 is between zero and 3.3 volt, and Vref is set to 1.4 volt.

Thus, in one implementation, when voltage Vc at terminal 406 is lower than Vref, comparator 440 outputs at terminal 407 Vco indicates digital "0". Once voltage Vc at terminal 406 starts to transition from a "low" (e.g., 0-volt) to a "high" (e.g. 3.3-volt) as a result of voltage V_in transitioning from "low" to "high" and reaches a voltage equal to or higher than Vref, comparator 440 outputs at terminal 407 a Vco indicating a digital "1". In other words, compared to voltage V_in of PWM signal 52, voltage Vco of monitoring facilitator signal 54 (at terminal 407), as illustrated, is either substantially in sync with V_in of PWM signal 52 (e.g. for use case 1) or having a delay (e.g. for use cases 2 and 3) which is dependent how high in voltage Vref is, in terms of transitioning from low to high.

Subsequently, so long as voltage Vc at terminal 406 stays "high", or decays from "high" but has yet decayed to Vref, comparator 440 continues to output at terminal 407 Vco indicating a digital "1". Thus, compared to voltage V_in of PWM signal 52, voltage Vco of monitoring facilitator signal 54 (at terminal 047), for each PWM cycle of V_in (namely, a cycle of going and staying "high" and then going and staying "low"), also exhibits, as illustrated, a PWM-like pattern with a non-zero duty cycle (which may be similar to or otherwise in line with, the duty cycle of V_in).

Hence, in a scenario where manual switch 25-MS is in the "closed" state during (e.g., the entire time period of) a particular cycle of PWM signal 52, in response to the application of PWM signal 52 onto Z_load 25-L, monitoring-facilitator module 102, through its comparator 440, generates at terminal 407 a corresponding monitoring facilitator signal 54. As illustrated in FIG. 5, during that particular cycle of PWM signal 52, the generated monitoring facilitator signal 54 has a PWM-like waveform with a duty cycle equal to or longer than that of PWM signal 52.

Turning to a scenario where manual switch 25-MS is in the "open" state, as well-known, no current conduction path can be formed under this scenario, since the opening of manual switch 25-MS cuts off any possible current flow on a serial path that goes through it, such as the monitoring path. As such, voltage Vc of monitoring response signal 53 at terminal 406 is always zero (low), resulting in voltage Vco of monitoring facilitator signal 54 at terminal 407 being always zero due to the exemplary configuration of comparator 440.

Hence, in a scenario where manual switch 25-MS is in the "open" during (e.g., the entire time period of) a particular cycle of PWM signal 52, in response to the application of PWM signal 52 onto Z_load 25-L, monitoring-facilitator module 102, through its comparator 440, generates at terminal 407 a corresponding monitoring facilitator signal 54 having a waveform (not shown) of a "low" signal level (e.g., zero voltage) maintained during that particular cycle of PWM signal 52. That is, during that particular cycle of PWM signal 52, the waveform of the generated monitoring facilitator signal 54, in terms of duty cycle, is of 0% duty cycle.

Thus, with the exemplary PWM signal 52 being used as a monitoring signal 52, monitoring-facilitator module 102 generates a monitoring facilitator signal 54 exhibiting waveform patterns indicating the contemporaneous state of manual switch 25-MS (namely, whether manual switch 25-MS is either in the "open" state or in the "closed" state) during each cycle of PWM signal 52. For example, during a particular cycle of PWM signal 52, if monitoring facilitator signal 54 exhibits a non-zero duty cycle similar to or otherwise in line with the duty cycle of PWM signal 52, then manual switch 25-MS is in the "closed" state during that particular cycle, and if monitoring facilitator signal 54 exhibits a duty cycle of 0%, then manual switch 25-MS is in the "open" state during that particular cycle. Also, as illustrated in FIG. 4, monitoring facilitator signal 54 is a simplified or normalized version of monitoring response signal 53, in the sense that the exemplary monitoring-facilitator module 102, in generating monitoring facilitator signal 54 based on monitoring response signal 53, "smooth out", "removes", simplifies, normalizes, or otherwise transform waveform pattern variations of monitoring response signal 53 (indicative of a change in state of manual switch 25-MS) to relatively standard waveform patterns (with minimum variations) that can be used to monitor or detect a change in state of manual switch 25-MS. As will be further described, these waveform patterns of monitoring facilitator signal 54 can therefore be used by controller module 110 to monitor or otherwise detect any change or changes in state of manual switch 25-MS.

Also, the fact that PWM signal 52 can cause load device 25 to generate a response signal 53, which exhibits waveform patterns indicative any change or changes of in state of manual switch 25-MS that can be identified (through the use of a monitoring-facilitator module, such as the monitoring-facilitator module 102 exemplified in FIG. 4), confirms that PWM signal 52 can be used as a monitoring signal 52. As a skilled artisan appreciates, the PWM signal 52 exemplified in FIG. 4 is just one example of monitoring signal 52. Any other signal (e.g., a sinusoidal signal) that can cause load device 25 to generate a response signal exhibiting waveform patterns indicative of any change or changes in state of manual switch 25-MS, may also be used as a monitoring signal 52 for SPMU 100. Thus, a monitoring signal 52 is not limited to the exemplified PWM signal 52.

Additionally, for the aforementioned monitoring path (means), PWM signal 52 can be of one of many frequencies to be an effective monitoring signal 52. As a skilled artisan appreciates, the faster the frequency of PWM signal 52 is, the more timely (or "instantaneously") a change in state of manual switch 25-MS can be monitored or otherwise detected. Thus, so long as the frequency of PWM signal 52 is reasonably fast that allows a change in state of manual switch 25-MS to be "instantaneously" monitored or otherwise detected by human standard, the frequency should be considered appropriate or otherwise effective. In one implementation, the frequency of a PWM signal 52 may be set or configured around 1 KHZ.

Next, the waveform of monitoring facilitator signal 54 may be used by controller module 110 to monitor or otherwise detect a change in state of manual switch 25-MS as the change occurs. As shown in FIG. 4, monitoring facilitator signal 54, which is continuously outputted by monitoring-facilitator module 102 at terminal 407, is supplied to pin P(3) of controller module 110. In this implementation, controller module 110 generates and outputs PWM signal 52 at pin P(2). Thus, controller module 110 knows relevant information about PWM signal 52, particularly the timing information of PWM signal 52. As disclosed above, specific waveform patterns of monitoring facilitator signal 54 can be used to determine a contemporaneous state of manual switch 25-MS during a particular cycle of PWM signal 52. Hence, with the knowledge about the timing of PWM signal 52, controller module 110, upon receiving monitoring facilitator signal 54, may, continuously determine and store, through one or more its software or hardware components, the contemporaneous state of manual switch 25-MS during each cycle of PWM signal 52 based on waveform patterns of the received monitoring facilitator signal 54 received (observed) during each cycle of PWM signal 52. As contemporaneous states of manual switch 25-MS during consecutive cycle of PWM signal 52 are continuously or otherwise continually determined and stored, controller module 110, may, at real-time, continuously (repeatedly) compare the two states of manual switch 25-MS across two latest or most latest consecutive time periods (e.g., two consecutive PWM cycles or two consecutive time periods each equal to a same multiple of a PWM cycle). Controller module 110 may then monitor or otherwise detect in real-time a change in state of manual switch 25-MS if the comparison indicates a change in state of manual switch 25-MS. Accordingly, the waveform of monitoring facilitator signal 54 can be used to accurately and reliably monitor or otherwise detect a real-time change in state of manual switch 25-MS (as the change takes place in real-time).

That monitoring-facilitator module 102 exemplified in FIG. 4 generates a monitoring facilitator signal 54 (based on anticipated waveform patterns of monitoring response signal 53) having simplified or normalized waveform patterns indicative of any change or changes in state of manual switch 25-MS—which subsequently facilitates or otherwise allows controller module 110 to identify any change or changes in state of manual switch 25-MS—confirms that the exemplified monitoring-facilitator module 102 is a viable implementation of a monitoring-facilitating module (configuration) provided to generate a facilitator signal (such as monitoring facilitator signal 54) from a raw natural response signal (such as response signal 53) to facilitate the monitoring of or otherwise detecting of change in state of manual switch 25-MS.

As a skilled artisan appreciates, the monitoring-facilitator module 102 exemplified in FIG. 4 is just one of many examples of such a monitoring-facilitating module. In fact, given a particular monitoring signal 52 and thus a particular monitoring response signal 53, any monitoring-facilitating module (configuration) that can generate, from the particular natural response signal 53, one or more facilitator signals (such as the exemplified signal 54), which can subsequently facilitate or otherwise allow controller module 110 to identify any change or changes in state of manual switch 25-MS, may be used as a monitoring-facilitator module 102 for SPMU 100.

As one example, a monitoring-facilitating configuration (module), which uses components different from those used in the monitoring-facilitator module 102 exemplified in FIG. 4 but generates a monitoring facilitator signal having a waveform same as or similar to the above-exemplified monitoring facilitator signal 54 in response to the above-exemplified monitoring response signal 53, may also be used as a monitoring-facilitator module 102 (e.g., in place of the monitoring-facilitator module 102 exemplified in FIG. 4) for SPMU 100. As another example, a monitoring-facilitating configuration (module), which, in response a monitoring response signal 53, generates a monitoring facilitator signal 54 having a waveform where any positive or negative edge transition (namely, a transition from "low" to "high" or a transition from "high" to "low") is indicative of a change in state of manual switch 25-MS, may also be used as a monitoring-facilitator module 102 (e.g., in place of the monitoring-facilitator module 102 exemplified in FIG. 4) for SPMU 100. As yet another example, a monitoring-facilitating configuration (module), which generates a facilitator signal 54, that modulates or otherwise transforms values or changes in current (as opposed to the above-illustrated values or changes in voltage) of a monitoring response signal 53, or values or changes in other characteristics (e.g., optical characteristics) of a monitoring response signal 53, for the purpose of simplification or normalization (in connection with monitoring or detecting a change of manual switch 25-MS based on the monitoring response signal 53), may also be used as a monitoring-facilitator module 102 (e.g., in place of the monitoring-facilitator module 102 exemplified in FIG. 4) for SPMU 100.

That is, so long as a monitoring-facilitating module can respond to a monitoring response signal 53 by generating a monitoring facilitator signal 54 whose waveform has simplified or otherwise normalized waveform patterns that can be respectively used to accurately and reliably identify a change in state of manual switch 25-MS, the use of that monitoring-facilitating module as a monitoring-facilitator module 102 (e.g., in place of the monitoring-facilitator module 102 exemplified in FIG. 4) for SPMU 100 does not depart from the spirit and scope of the present disclosure.

Returning to FIG. 4, controller module 110 may be implemented using a single microcontroller comprising component modules illustrated in FIGS. 3A and 3B. As noted above, controller module 110 may include a monitoring signal generator 302 generating a monitoring signal 52 and providing the generated monitoring signal 52 via pin P(2). In one implementation, controller module 110 may instruct or otherwise cause monitoring signal generator 302 to output monitoring signal 52 during both the operation mode and the monitor mode. In one implementation, controller module 110 may instruct or otherwise cause monitoring signal generator 302 to output monitoring signal 52 only during the monitor mode.

Moreover, controller module 110 may supply relay module 101, via, e.g., pin P(1), a control signal 51 (which, as noted, may be a digital signal) indicating or otherwise indicative of a state (mode) in which relay module 101 should operate according to the operating mode of SPMU 100 as determined by one or more power management routines 333 of controller module 110 (using, e.g., any known technology of outputting a digital signal used in commercial microcontrollers).

The operating mode of SPMU 100 may be set or otherwise changed by one or more power management routines 333 in response to receiving a conspicuous (express) user request. A conspicuous user request may be expressly inputted by a user through different means. For example, as noted above in connection with FIG. 3B, a conspicuous (express) user request—which, e.g., requests that a load device 25 paired with a particularly identified SPMU 100 be turned off (which results in the operating mode of the particularly identified SPMU 100 being eventually set to the "monitor mode")—may be remotely sent by a user via, e.g., a smart phone app through leveraging either web server 331 or the combination of automation network infrastructure provided by control center 220 and automation network interface 335 of the SPMU 100.

As another example, the same user request may be inputted through pressing a remote control directed at SPMU 100 (by, e.g., pressing a button on the remote control) using known wireless technologies (such as infrared or RF technologies). The pressing of the button may result in a wireless signal being received by communication unit 304 of controller module 110, which may then eventually call one or more power management routines 333 to set the operating mode of SPMU 100 to the monitor mode.

As yet another example, the same request may be inputted through interface module 104 by, e.g., pressing a toggle button of interface module 104. As illustrated in FIG. 4, a toggle button 104 of interface module 104 is coupled to pin P(m). The pressing of toggle button 104 generates an interrupt, which, through interrupt unit 308, triggers the execution of an interrupt service routine (ISR) 332. The triggered ISR 332 may then forcibly (unconditionally) toggles the operating mode between the "operation mode" and the "monitor mode" by, e.g. calling one or more power management routines 333 to perform operations necessary to implement the setting of the particular operating mode as called for by the toggling.

When a contemporaneous (current) operating mode of SPMU 100 is the monitor mode (meaning that relay module 101 is in the monitor mode configuration), the operating mode of SPMU 100, according to the present disclosure, may also be set or otherwise changed to the operation mode by one or more power management routines 333 in response to a change in state of manual switch 25-MS monitored or otherwise detected by controller module 110 through the aforementioned monitoring path, thus automatically realizing giving back to a human operator (who is attempting to operate load device 25 through its manual switch 25-MS) the desired control to operate load device 25 through operating its manual switch 25-MS.

Specifically, as described above, a change in state of manual switch 25-MS may be monitored or otherwise detected by controller module 110 through the monitoring facilitator signal 54 continuously supplied to controller module 110 by monitoring-facilitator module 102 (via, e.g., pin P(3) of controller module 110). In a first exemplary implementation (hereinafter referred to as "state-based implementation"), as discussed above, a first set of one or more specific patterns of a contemporaneous waveform of monitoring facilitator signal 54 indicate that manual switch 25-MS is in the "closed" state. A different second set of one or more specific patterns of a contemporaneous waveform of monitoring facilitator signal 54 indicate that manual switch 25-MS is in the "open" state. In this first exemplary implementation, controller module 110 may, as noted above, continuously or otherwise continually monitor and record data about contemporaneous states of manual switch 25-MS based on received contents of monitoring facilitator signal 54 (via, e.g. one or more power management routines 333), and detect a change in state of manual switch 25-MS based on, e.g., the monitored and recorded data about respective states of manual switch 25-MS of two latest or most latest consecutive time periods.

In a second exemplary implementation (hereinafter referred to as "transition-based implementation"), as discussed above, monitoring facilitator signal 54 may be so configured that any positive or negative edge transition indicates a change in state of manual switch 25-MS. In this second exemplary implementation, controller module 110 may detect a change in state of manual switch 25-MS through, e.g., an interrupt triggered by any positive or negative edge transition detected a pin P(3). The interrupt triggers the execution of a corresponding interrupt service routine (ISR) 332, which enables controller module 110 to detect a change in state of manual switch 25-MS.

Figure 6:
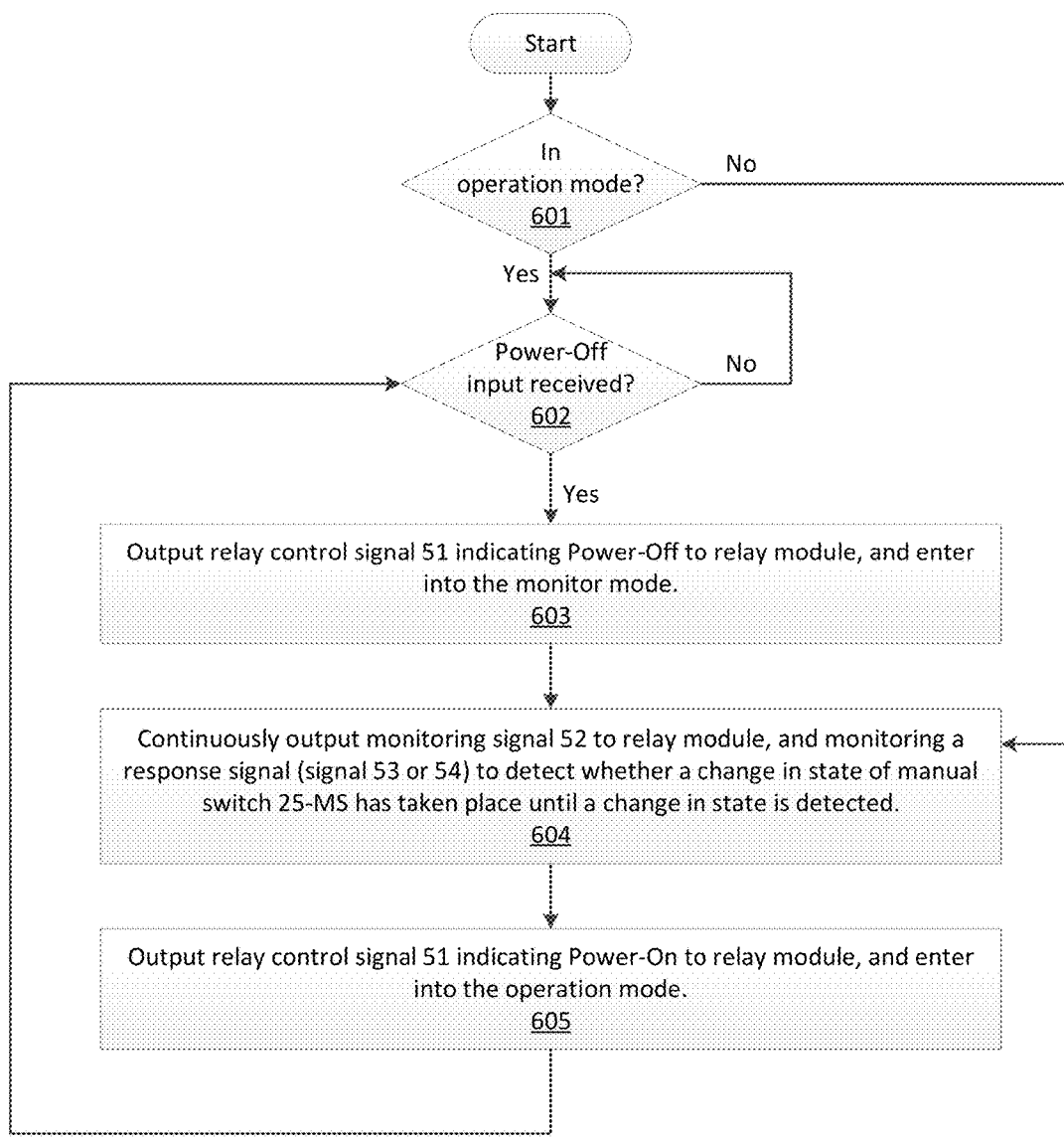
FIG. 6 is flowchart illustrating an exemplary simplified control flow used by a controller module to implement the disclosed smart power management apparatus and method, according to one or more embodiments of the present disclosure.

FIG. 6 is flowchart illustrating a simplified exemplary control flow used by controller module 110 to automatically (programmatically) realize giving back to the human operator the desired control to operate load device 25 through operating its manual switch 25-MS, according to one or more embodiments of the present disclosure. The exemplary control flow may be implemented by controller module 110 in the main logic-processing loop via one or more power management routines 333. As used herein, the terms "block" and "step" may be used interchangeably to refer to a set of programmatic (software) code or instructions adapted to perform one or more specific functions (when executed by one or more processors), or the one or more performed specific functions, or any combination thereof.

At decision 601, controller module 110 checks whether the current operating mode is the operation mode. Controller module 110 may perform this checking by checking a programmatic flag (hereinafter referred to as "the operating mode flag") in memory 308 documenting (storing) the current operating mode. If the current operating mode is not the operation mode—which means that the current operating mode is the monitor mode—controller module 110 proceeds to block 604, which will be further discussed below. If the current operating mode is the operation mode, controller module 110 proceeds to decision 602.

At decision 602, controller module 110 checks whether a "power-off" input request requesting turning off the power (to the supplied load device 25) is received. Controller module 110 may perform this checking by checking a programmatic flag (hereinafter referred to as "the power-off request flag") in memory 308 documenting such an input request. As discussed above, this input request may be sent by a user remotely through a smart phone app, locally through a remote control, or physically by pressing toggle button 104.

If, at decision 602, controller module 110 determines that no such a "power-off" input request is received, controller module 110 loops back to decision 602. In one implementation, controller module 110 may sleep for a pre-set period of time (such as one second or one minute) before looping back decision 602. If during one period of sleep, such a request is indeed received as reflected and documented by the power-off request flag—which can be set by an ISR 332 (running in a different thread (or process) separate from the main thread (of the main process)) triggered by the pressing of toggle button 104 or the receiving of a command from a local remote control, or by web server 331 or automation network interface module 335 (running in a different thread (or process) separate from the main thread (of the main process))—controller module 110 may discover, at the beginning of the next loop, that a power-off input request is received.

If, at decision 602, such a "power-off" input request is indeed received, controller module 110 proceeds to block 603, where controller module 110 may invoke code (e.g., a specific power management routine) configured to implement setting the operating mode of SPMU 100 to the monitor mode. Among other things, in block 603, controller module 110 may invoke code configured to set the operating mode flag to a value representing the monitor mode. Additionally, in block 603, controller module 110 may invoke code configured to have pin P(1) output to relay module 101 a control signal 51 indicating or otherwise indicative of the monitor mode. This control signal 51, as disclosed above, results in relay module 101 switching to the monitor mode (or, in other words, switching to the monitor mode configuration).

Block 603 may then proceed to block 604. In block 604, controller module 110 may invoke code configured to have monitoring signal generator 302 (e.g., PWM unit 302) continuously generate a monitoring signal 52 (e.g., PWM signal 52) and output the generated monitoring signal 52 (which, as disclosed above, is received by relay module 101 as relay module 101 is switched to the monitor mode configuration).

Additionally, in block 604, controller module 110 is configured to continuously or otherwise continually monitor monitoring facilitator signal 54 (which, as disclosed above, is continuously supplied by monitoring-facilitator module 102 via pin P(3)) to monitor or otherwise detect whether a change in state of manual switch 25-MS has just taken place, until such a change is detected. In other words, detecting an occurrence of a change in state of manual switch 25-MS completes block 604. In one embodiment, controller module 110 may implement the detection (of a change in state of manual switch 25-MS) using the above-described state-based implementation. In another embodiment, controller module 110 may implement the detection using the above-described transition-based implementation.

In a transition-based implementation, since, as disclosed above, a change in state of manual switch 25-MS may be detected by an ISR 332 triggered by an interrupt, the ISR 332 may document a detected change in state of manual switch 25-MS using a flag (hereinafter referred to as "state change flag") in memory 308 by, e.g., setting the state change flag. Thus, the transition-based implementation may include a loop, in which controller module 110 may sleep for a pre-set period of time (such as one second or 10 seconds) and then check whether the state change flag is set. If the state change flag is discovered not set, controller module 110 loops back. On the other hand, if the state change flag is discovered set, which indicates that a change in state of manual switch 25-MS has just been detected (as the change has occurred), controller module 110 resets the state change flag and completes block 604.

In a state-based implementation, detecting whether a change in state of manual switch 25-MS has occurred, may be performed either in the main thread (of the main process) or in a thread (or process) separate from the main thread (using, e.g. the control logic described above or other applicable control logic). If the detecting is performed in the separate thread, the state change flag may be set in that separate thread (as applicable). Block 604 may then use a loop similar to the one used for a transition-based implementation (as described above) to monitor or otherwise detect a change in state of manual switch 25-MS in real-time.

After the completion of block 604, meaning that an occurrence of a change in state of manual switch 25-MS has been detected, controller module 110 proceeds to block 605, where controller module 110 invokes code (e.g., a specific power management routine) configured to implement setting the operating mode of SPMU 100 to the operation mode, so as to materialize giving back to the human operator the desired control to operate load device 25 through operating its manual switch 25-MS. Among other things, in block 605, controller module 110 may invoke code configured to set the operating mode flag to a value representing the operation mode. Additionally, in block 605, controller module 110 may invoke code configured to have pin P(1) output to relay module 101 control signal 51 indicating or otherwise indicative of the operation mode. This control signal 51, as disclosed above, results in relay module 101 switching to the operation mode (or, in other words, switching to the operation mode configuration). Optionally, in block 605, controller module 110 may invoke code configured to discontinue generating and outputting monitoring signal 52. After the completion of block 605, controller module 110 loops back to decision 602.

A skilled artisan appreciates that since a control flow of controller module 110 may be unconditionally (forcibly) and randomly interrupted by one or more interrupts, the exemplary control flow illustrated in FIG. 6 is not absolute and can be randomly disrupted by one or more interrupts. Thus, at any given moment, if there is a change in the operating mode of SPMU 100 that is caused by an interrupt—e.g., an interrupt generated a result of pressing toggle button 104, an interrupt generated as a result of web server 331 or automation network interface module 335 receiving an input request requesting a change in the operating mode, or an interrupt generated as a result of detecting a change in state of manual switch 25-MS—controller module 110 may be configured to unconditionally jump back to a default block (such as decision block 601), regardless of where or which the current executing block is.

Figure 7A:
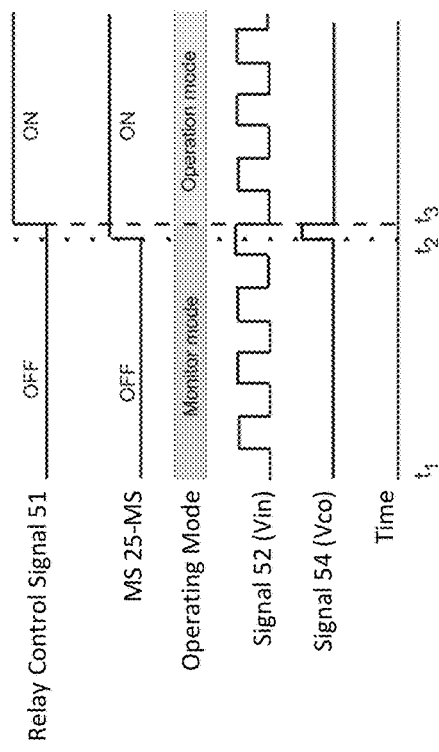
FIGS. 7A-B are simplified waveforms of relevant signals illustrating how a controller module automatically gives back to a human the control to operate load device 25 through manual switch 25-MS, once the controller module monitors a change in state of manual switch 25-MS where SPMU 100 operates the in operation, according to one or more embodiments of the present disclosure.
Figure 7B:
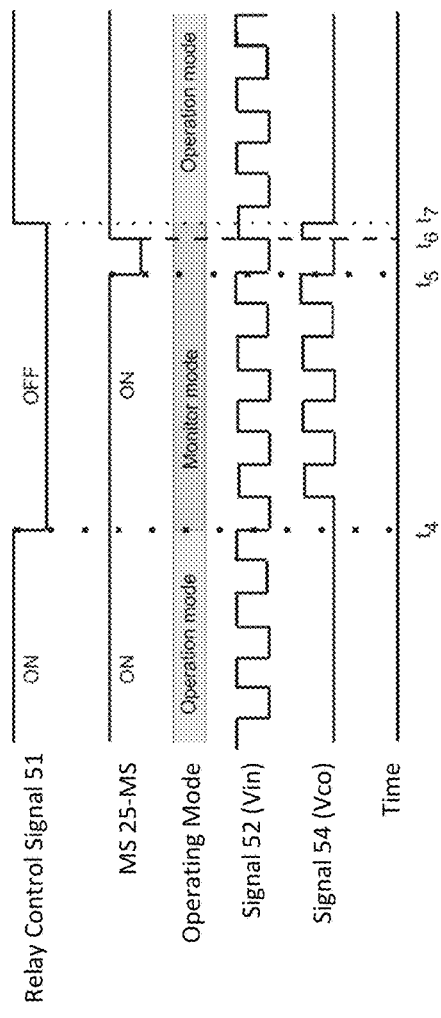

FIGS. 7A-B are waveforms of relevant signals illustrating two examples of how controller module 110 automatically gives back to a human the control to operate load device 25 through operating its manual switch 25-MS, once the controller module monitors in real-time a change in state of manual switch 25-MS where SPMU 110 is operating in the operation mode (under which a human would have otherwise lost such a control through manual switch 25-MS in the conventional art), according to one or more embodiments of the present disclosure.

Referring to FIG. 7A, which demonstrates the first of the two examples, in a period between time t1 and time t2, SPMU 100 operates in the monitor mode, resulting in control signal 51 being "low", which causes relay module 101 to operate in the monitor mode configuration. As noted, that SPMU 100 operating in the monitor mode may result from one member of the household (e.g., the husband) having remotely instructed SPMU 100 to disconnect power from the paired load device 25 using an app on the member's smart phone. As relay module 101 operates in the monitor mode configuration, relay module 101 is configured to cut off incoming A/C power from load device 25, causing load device 25 to be turned off or otherwise de-energized. In this example, during this period between t1 and t2, manual switch 25-MS, as shown, is in the "open" state, meaning that manual switch 25-MS is turned off. Correspondingly, during this period, monitoring facilitator signal 54 stays "low" during each cycle of PWM signal 52.

At time t2, a human operator (e.g., the wife of the household) attempts to turn on or otherwise energize load device 25 by turning on manual switch 25-MS, resulting in manual switch 25-MS being in the "closed" state. In the conventional art, such an act, under this circumstance, would "fall on deaf ears," and thus would be useless in terms of energizing load device 25. This is because in the conventional art, when a relay in a power management unit (situated similar to relay module 101 in a disclosed SPMU 100) is configured to cut off incoming A/C power from load device 25, a human operator loses the control to energize load device 25 through manual switch 25-MS, thus resulting in any deliberate act of the human operator performed on manual switch 25-MS—such as this act of turning on manual switch 25-MS (by, e.g. turning the manual switch knob if the manual switch is knob, or making motions in front of a motion sensor switch)—useless.

With a disclosed SPMU 100, when relay module 101 is configured to cut off incoming A/C power from load device 25, relay module 101 is configured according to the monitor mode configuration, a configuration which, in addition to being configured to disconnect power from load device 25, is simultaneously being configured to couple the pair load device 25 to devices provided for the monitoring purpose (including a monitoring signal generator 302 and a monitoring-facilitator module 102), thereby forming a monitoring path that enables SPMU 100 to continuously monitor or otherwise detect whether a change in state of manual switch 25-MS has occurred. With the monitor mode configuration of relay module 101 (not otherwise available in the similarly situated relay module in the conventional power management unit), the human operator's operating of manual switch 25-MS no longer "falls on deaf ears", and instead is captured or otherwise detected by the disclosed SPMU 10.

Thus, as illustrated in FIG. 7A, when the human operator performs a deliberate act to turn on manual switch 25-MS at time t2, the monitor mode configuration of SPMU 100, which includes the use of PWM signal 52 and monitoring-facilitator module 102, captures or otherwise detects the deliberate act by outputting and supplying to controller module 110 a monitoring facilitator signal 54 indicative of a change from the previous "OFF" to the latest "ON" in the state of manual switch 25-MS. Upon receiving the monitoring facilitator signal 54, controller module 110 detects such a change in state of manual switch 25-MS based on the monitoring facilitator signal 54, and subsequently at time t3 outputs control signal 51 (with "high" signal level) indicating or otherwise indicative of that relay module 101 be switched to the operation mode, resulting in relay module 101 being switched to the operation mode configuration (which is configured to supply (conduct) incoming A/C power to load device 25) at time t3, thereby giving back to the human operator the control to operate load device 25 through operating its manual switch 25-MS, as desired under the circumstance. At time t3, with relay module 101 being in the operation mode and manual switch 25-MS having just been turned on by the human operator, the paired load device 25 becomes energized, a result which is intended and desired by the human operator, but which, as noted above, cannot be readily attained in the convention art without going through undue inconveniences.

FIG. 7B demonstrates a second example of how controller module 110 automatically gives back to a human operator the control to operate load device 25 through operating its manual switch 25-MS after SPMU 100 is switched from the operation mode (where the paired load device 25 is connected to the incoming power) to the monitor mode where (where the paired load device 25 is disconnected from the incoming power).

In the first example (shown in FIG. 7A), manual switch 25-MS is OFF (in the "open" state) when SPMU 100 is in the monitor mode before the human operator is detected operating manual switch 25-MS. In the second example, however, manual switch 25-MS, as shown in FIG. 7B, is ON (in the "closed" state) when SPMU 100 is switched (e.g., remotely) from the operation mode to the monitor mode at time t4 and stay in the monitor mode thereafter before time t5.

This scenario occurs when one member of the household (e.g., the husband) somehow left the load device 25 on and later decided to save power by remotely instructing SPMU 100 to disconnect the power from the load device 25, thereby resulting in the load device 25 being de-energized while manual switch 25-MS being left "ON" (in the "closed" state). Thus, this scenario is precisely the very scenario for which a remotely-controllable conventional power management unit is designed in order to save power (otherwise unnecessarily consumed by the paired load device 25), and therefore should occur quite common and often. When facing this scenario under the conventional art, although power is saved with the remote-controlling capability, another member of the household (e.g., the wife of the household) may face the undesirable reality of not being able to re-energize the load device 25 through operating its manual switch 25-MS without going through undue inconveniences.

At time t5, noting that the load device 25 is not energized, a human operator (e.g., the wife of the household) turns the manual switch 25-MS, thus changing the state of manual switch 25-MS from "ON" to "OFF." As the disclosed SPMU 100 (particularly relay module 101) is in the monitor mode at time t5, through the aforementioned monitoring means established (as a result of the monitor mode configuration of relay module 101), monitoring facilitator signal 54 is generated (as a result of monitoring PWM signal 52 being applied to load device 25) indicative of a changing from "ON" to "OFF" in state of manual switch 25-MS.

At time t6, controller module 110 captures or otherwise detects this change in state of manual switch 25-MS and accordingly outputs control signal 51 indicating (or otherwise indicative of) the operation mode, resulting in relay module 101 being driven to switch from the monitor mode to the operation mode, thereby giving back to the human operator the control to operate load device 25 through operating manual switch 25-MS. At this time, since the manual switch of 25-MS at time t6 is "OFF" (as it has been switched from "ON" to "OFF" by the human operator), the load device 25 is still de-energized despite that the SPMU 100 has just been switched to the operation mode.

However, since the natural human reaction to the situation that the load device 25 is still de-energized is to turn, flip or otherwise operate manual switch 25-MS again while turning, flipping or otherwise operating manual switch 25-MS is usually very easy to perform for a human, the human operator, as expected, immediately to turn, flip or otherwise operate manual switch 25-MS once again at time t7, resulting in manual switch 25-MS being switched to "ON" at time t7. Because the control to operate load device 25 through operating manual switch 25-MS was already given back to the human operator at time t6, the load device 25 becomes energized as the 25-MS being switched to "ON" at time t7, a result which is intended and desired by the human operator, but which, as noted above, cannot be readily attained in the convention art without going through undue inconveniences.

Accordingly, in a situation where an SPMU 100 operates in a "cutoff mode" configuration, unlike the conventional art which would have rendered the human operator undesirably losing the desired control to operate the paired load device 25 through its manual switch 25-MS, the present disclosure—by strategically incorporating a simultaneous monitor mode configuration configured to automatically (programmatically) detect a change in state of manual switch 25-MS and advantageously give back to a human operator the control to operate load device 25 through operating manual switch 25-MS (when such a state change is programmatically detected) by having the SPMU 100 switched back to the operation mode configuration—enables the human operator to regain the desired control to operate load device 25 through operating its manual switch 25-MS.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

What is claimed is:

1. A power management apparatus used to manage power consumption of a downstream electronic load device having a load, the load configured to be in series connection with a manual switch via a first terminal of the manual switch, the manual switch configured to control energizing or de-energizing of the load, the manual switch configured to be operated by an on-site human intervention to switch among a plurality of states including a power-on state and a power-off state, the power-on state of the manual switch configured to cause a closed circuit configured to conduct incoming electric power supplied from an upstream power supply to the load so as to energize the load, the power-off state of the manual switch configured to cause an open circuit configured to cut off the incoming electric power to the load so as to de-energize the load, the power management apparatus comprising:

a relay module configured to operate in an operating mode from among a set of operating modes including an first operating mode and a second operating mode;

a controller module configured to select a relay control signal from among a set of relay control signals and output the selected relay control signal, the set of relay control signals each corresponding to an operating mode from among the set of operating modes;

wherein the relay module is configured to receive the selected relay control signal and operate in the respective operating mode corresponding to the selected relay control signal;

wherein when the relay module operates in the first operating mode, the relay module is configured to connect the load device to the power supply so as to conduct the incoming electric power to the load, and when the relay module operates in the second operating mode, the relay module is configured to disconnect the power supply from the load device so as to cut off the incoming electric power to the load while simultaneously enable a monitoring means configured to monitor in real time a change in state of the manual switch;

wherein when the relay module operates in the second operating mode, the monitoring means is configured to apply a monitoring signal to the load device via the relay module, generate a utility response signal indicative of whether in real-time there is a change in state of the manual switch, and supply the utility response signal to the controller module via the relay module; and wherein when the relay module operates in the second operating mode, the controller module, upon detecting in real-time a change in state of the manual switch based on the received utility response signal, selects, from among the set of relay control signals, a first relay control signal corresponding to the first operating mode, and outputs the selected first relay control signal so as to cause the relay module to switch from operating in the second operating mode to operating in the first operating mode.

2. The power management apparatus of claim 1, further comprising:

a monitoring-facilitator module configured to, when the relay module operates in the second operating mode, receive a monitoring response signal generated and outputted at a second terminal of the manual switch as result of the monitoring signal being applied to the load device, and generate a monitoring facilitator signal as the utility response signal supplied to the controller module, such that the monitoring facilitator signal is configured to facilitate the monitoring in real-time of a change in state of the manual switch by the controller module.

3. The power management apparatus of claim 2, wherein when the relay module operates in the second operating mode, the relay module is configured to receive the monitoring signal and energize the load with the monitoring signal so as to generate the monitoring response signal, and connect the monitoring-facilitator module to the manual switch so as to enable the monitoring-facilitator module to receive the monitoring response signal.

4. The power management apparatus of claim 2, wherein when the relay module operates in the first operating mode, the relay module is configured to disconnect the manual switch from the monitoring-facilitator module.

5. The power management apparatus of claim 1, wherein the relay module comprises a first relay and a second relay, each of the first and second relays having a respective control node and configured to operate in one of at least two configurations as determined by a respective control signal supplied to the respective control node.

6. The power management apparatus of claim 2, wherein the relay module comprises a first relay and a second relay, each of the first and second relays having a respective control node and configured to operate in one of at least two configurations as determined by a respective control signal supplied to the respective control node;

wherein each of the first and second relays of the relay module has an anchor node, a first input node and a second input node;

wherein for the first relay, the respective first input node is configured to receive the monitoring signal, the respective second input node is coupled to a first input line of the power supply, and the respective anchor node is coupled to an input connector of the load device corresponding to the first input line of the power supply;

wherein for the second relay, the respective first input node is coupled to an input terminal of the monitoring-facilitator module for supplying the monitoring response signal when the relay module operates in the second operating mode, the respective second input node is coupled to a second input line of the power supply, and the respective anchor node is coupled to the second terminal of the manual switch.

7. The power management apparatus of claim 5, wherein the relay module further comprises an intermediate circuit configured to receive the selected relay control signal and transform the received selected relay control signal to a common control signal supplied to the respective control nodes of both the first and second relays.

8. The power management apparatus of claim 2, wherein the monitoring-facilitator module is configured to normalize the received monitoring response signal to the monitoring facilitator signal configured to use one or more signal levels to indicate in real-time one or more respective corresponding states of the manual switch during one duration of the monitoring signal, so as to facilitate the controller module to monitor in real-time a change in state of the manual switch based on at least a change in signal level captured in the monitoring facilitator signal.

9. The power management apparatus of claim 8, wherein the monitoring-facilitator module comprises a comparator having a V+ terminal, V− terminal, and an output terminal, with the V+ terminal configured to receive the monitoring response signal, the V− terminal configured to receive a reference voltage, and the output terminal configured to generate and output the monitoring facilitator signal supplied to the controller module.

10. The power management apparatus of claim 1, wherein the monitoring signal is supplied by the controller module via an output pin thereof.

11. The power management apparatus of claim 1, wherein the controller module further comprises a network interface unit and a server software module, the server software module configured to enable the controller module to receive and handle power management and control commands received from a remote device via the Internet by the network interface unit.

12. The power management apparatus of claim 11, wherein the controller module comprises a wireless network interface module configured to interface with a wireless network provider so as to enable the power management apparatus to tap into a wireless local area network.

13. The power management apparatus of claim 11, wherein the controller module comprises an automation network interface module configured to interface with an existing automation network so as to enable the power management apparatus to tap into an automation network.

14. The power management apparatus of claim 1, wherein the monitoring signal comprises a periodic signal.

15. The power management apparatus of claim 14, wherein the monitoring signal comprises a PWM signal having a non-zero duty cycle.

16. The power management apparatus of claim 1, wherein the manual switch is configured to be built into the load device such that the load device comprises the manual switch.

17. The power management apparatus of claim 1, wherein the manual switch is configured to be operated by the on-site human intervention to switch between two states, the two states consisting of the power-on state and the power-off state.

18. The power management apparatus of claim 1, wherein the on-site human intervention comprises at least one of physically turning a knob of the manual switch, physically pressing on a button on a remote control of the manual switch, and making physical motion in front of a motion sensor of the manual switch.

19. The power management apparatus of claim 1, wherein the manual switch is configured to be downstream to the load.

* * * * *